(12) United States Patent
Crawford

(10) Patent No.: US 7,551,677 B2
(45) Date of Patent: Jun. 23, 2009

(54) OFDM PILOT TONE TRACKING FOR WIRELESS LAN

(76) Inventor: James A. Crawford, 13183 Seagrove St., San Diego, CA (US) 92130

( * ) Notice: Subject to any disclaimer, the term of this patent is extended or adjusted under 35 U.S.C. 154(b) by 533 days.

(21) Appl. No.: 10/636,512

(22) Filed: Aug. 6, 2003

(65) Prior Publication Data

US 2004/0114675 A1 Jun. 17, 2004

Related U.S. Application Data

(60) Division of application No. 09/935,081, filed on Aug. 21, 2001, now Pat. No. 6,633,616, which is a continuation-in-part of application No. 09/790,429, filed on Feb. 21, 2001, now Pat. No. 6,549,583.

(51) Int. Cl.
H04K 1/10 (2006.01)
H04J 11/00 (2006.01)
(52) U.S. Cl. .................................. 375/260; 370/210
(58) Field of Classification Search ................. 375/144, 375/145, 148, 149, 226, 260; 370/208, 210, 370/335, 342
See application file for complete search history.

(56) References Cited

U.S. PATENT DOCUMENTS

| | | | |
|---|---|---|---|
| 5,170,415 A | | 12/1992 | Yoshida et al. |
| 5,577,072 A | | 11/1996 | Moon et al. |
| 5,799,047 A | | 8/1998 | Dobrica |
| 5,930,305 A | * | 7/1999 | Leib ............................ 375/324 |
| 5,940,450 A | * | 8/1999 | Koslov et al. ................ 375/344 |
| 6,035,003 A | * | 3/2000 | Park et al. .................... 375/326 |
| 6,181,258 B1 | | 1/2001 | Summers et al. |
| 6,218,896 B1 | | 4/2001 | Becker et al. |

(Continued)

FOREIGN PATENT DOCUMENTS

EP 0822682 2/1998

OTHER PUBLICATIONS

European Telecommunications Standards Institute 2000 (ETSI); "Broadband Radio Access Networks (BRAN): Hiperlan Type 2; Physical (PHY) Layer": Technical Specifications; http://www.etsi.org: pp. 1-40; ETSI TS 101 475 V1.1.1 (Apr. 2000).

(Continued)

Primary Examiner—Young T. Tse
(74) Attorney, Agent, or Firm—Connolly Bove Lodge & Hutz LLP

(57) ABSTRACT

A pilot phase tracking loop for an OFDM receiver including a phase rotator receiving an incoming signal, a fast Fourier transform coupled to a phase rotator output, and a pilot phase error metric including a discrete Fourier transform portion coupled to the phase rotator output. The pilot phase error metric determines a phase error estimate associated with a received OFDM symbol, e.g., a data symbol, from the phase rotator output. A loop filter is coupled to the pilot phase error metric output and an oscillator is coupled to the loop filter output. The oscillator output is coupled to the phase rotator to adjust the phase of subsequent OFDM symbols of the incoming signal. Phase noise introduced by a radio portion of the OFDM receiver and OFDM transmitter is reduced by the baseband portion of the OFDM receiver improving OFDM signal tracking under poor SNR conditions.

37 Claims, 13 Drawing Sheets

U.S. PATENT DOCUMENTS

| | | | |
|---|---|---|---|
| 6,310,926 B1 | 10/2001 | Tore | |
| 6,370,188 B1 * | 4/2002 | Wu et al. | 375/222 |
| 6,470,030 B1 * | 10/2002 | Park et al. | 370/480 |
| 6,549,561 B2 | 4/2003 | Crawford | |
| 6,549,583 B2 | 4/2003 | Crawford | |
| 6,891,792 B1 * | 5/2005 | Cimini et al. | 370/206 |
| 7,061,997 B1 * | 6/2006 | Eberlein et al. | 375/332 |
| 2003/0026371 A1 * | 2/2003 | Laroia et al. | 375/362 |

OTHER PUBLICATIONS

IEEE Computer Society; "Draft Supplement to Standard [for] Information Technology-Telecommunications and Information Exchange Between Systems-Local and Metropolitan Area Networks-Specific Requirements-Part 11: Wireless LAN Medium Access Control (MAC) and Physical Layer (PHY) Specifications: High Speed Physical Layer in the 5 Ghz Band"; IEEE P802 11a/D7.0; Supplement to IEEE Standard 802.Nov. 1999; (1999); pp. 1-90.

Baoguo Yang, et al., "Timing Recovery for OFDM Transmission". IEEE JOurnal of Selected Areas in Communications, Nov. 2000, pp. 2278-2291, vol. 18, No. 11, IEEE.

Jihoon Choi, et al., "Carrier Frequency Offset Compensation for Uplink of OFDM-FDMA Systems", IEEE Communications Letters, Dec. 2000, pp. 414-416, vol. 4, No. 12, IEEE.

Dusan Matic, et al., "OFDM Synchronisation Based on the PHase Rotation of Sub-Carriers," IEEE JOurnal, 2000, pp. 1260-1264, IEEE.

Stefan A. Fechtel, "Performance of OFDM Carrier and Sampling Frequency Synchronization on Stationary and Mobile Channels", International Conf. on Consumer Electronics 2000, IEEE Journal, Jun. 13-15, 2000, pp. 18-19, IEEE.

Hyoung-Kyu Song, et al., "Frequency-Offset Synchronization and Channel Estimation for OFDM-Based Transmission," IEEE Communications Letters, Mar. 2000, pp. 95-97, vol. 4, No. 3, IEEE.

Sebastian Simoens, et al. "A New Method for Joint Cancellation of Clock and Carrier Frequency Offsets in OFDM Receivers over Frequency Selective Channels", Center de Recherche Motorola Paris, Espace Technologique Saint-Aubin 99193, Gif-sur Yvette France, pp. 390-394, IEEE VTC2000, IEEE.

Fred Daneshgaran, et al., "ML Symbol Synchronization for Multichannel Modulation: Analysis and Implementation", ECE Department, California State University, Los Angeles, pp. 1-5.

Timothy M. Schmidl, et al., "Robust Frequency and Timing Synchronization for OFDM", IEEE Transactions on Communications, Dec. 1997, pp. 1613-1621, vol. 45, No. 12, IEEE.

Hui Liu, et al., "A High-Efficiency Carrier Estimator for OFDM Communications," IEEE Communications Letters, Apr. 1998, vol. 2, No. 4, pp. 104-106, IEEE.

Paul H. Moose, "A Technique for Orthogonal Frequency Divisional Multiplexing Frequency Offset Correction," IEEE Transactions on Communications, Oct. 1994, vol. 42, No. 10, pp. 2908-2914, IEEE.

Paul Koufalas, "State Variable Approach to Carrier Phase Recovery and Fine Automatic Gain Control on Flat Fading Channels," Aug. 30, 1996, Submitted to the School of Physics and Electronic Systems Engineering of the Faculty of Information Technology of the University of South Australia for the Degree of Master of Electronic Engineering by Research, University of South Australia.

* cited by examiner

OFDM PILOT TONE TRACKING FOR WIRELESS LAN

CROSS-REFERENCE TO RELATED APPLICATIONS

This application is a divisional of U.S. Application Ser. No. 09/935,081, filed Aug. 21, 2001, now U.S. Pat. No. 6,633,616 which is a continuation-in-part of U.S. application Ser. No. 09/790,429, filed Feb. 21, 2001, now U.S. Pat. No. 6,549,583, both of which are hereby incorporated by reference in their entireties.

This patent document relates to the following patent documents, all of which are incorporated herein by reference: U.S. patent application Ser. No. 09/935,243, filed Aug. 21, 2001, now U.S. Pat. No. 6,549,561; and U.S. patent application Ser. No. 09/935,083, filed Aug. 21, 2001.

BACKGROUND OF THE INVENTION

1. Field of the Invention

The present invention relates generally to orthogonal frequency division multiplexed (OFDM)-based communications, and more specifically to tracking pilot tones of OFDM-based communications to reduce phase noise requirements in the radio portion of an OFDM receiver, as well as provide nearly optimal frequency error tracking performance.

2. Discussion of the Related Art

In wireless local area network (WLAN) applications, multiple devices communicate with each other via OFDM-based radio frequency (RF) wireless links. A common format for such OFDM communication is based upon the IEEE 802.11a standard or the HiperLAN2 standard, for example. Good local oscillator (LO) phase noise performance in the radio portion of the OFDM transmitters and receivers is critical in such OFDM-based communications when using complex signal constellations, such as 64-QAM and 256-QAM (quadrature amplitude modulation). This is because the symbol rate is chosen to be low enough to combat the severe multipath propagation characteristics that exist like those in indoor wireless applications and this low symbol rate also leads to greater phase noise related performance impairment. For example, in IEEE 802.11a and HiperLAN2, the symbol rate is approximately 250 kHz thereby accentuating the need to have excellent phase noise performance in the radio at frequency offsets from the carrier in the vicinity of 250 kHz and less.

Furthermore, the phase of the RF signaling is effected by phase noise generated in the local oscillators (LOs) of both the transmitter and the receiver. Also, phase perturbations are introduced when the transmitter or the receiver physically moves relative each other and also when the multipath changes, e.g., a door is opened. Unfortunately, poor LO phase noise performance leads to a potentially high symbol error rate, which seriously degrades both the communication range and throughput of the system. For example, in a typical system using IEEE 802.11a, it is estimated that the acceptable phase noise interfering with each subcarrier of the OFDM waveform is on the order of 2.7 degrees rms. While this may be acceptable for QPSK and 16-QAM modulations, it is excessive for 64-QAM modulation or higher constellations, resulting in constellation points being easily confused.

Further adding to the problem is the fact that most transmitters and receivers of such wireless products are highly integrated on a single device or chip. As such, the performance of the RF portion of the receiver, for example, is relatively limited. Furthermore, implementing the RF portion of the system to have the desired good phase noise performance that is required for higher order modulations, such as 64-QAM and above, is very difficult when implemented on a single chip with low supply voltages (e.g., 3.3 volts).

SUMMARY OF THE INVENTION

The present invention advantageously addresses the needs above as well as other needs by providing a pilot tracking system utilizing an optimum pilot phase error metric based on a maximum likelihood estimation approach in the baseband processing portion of the OFDM-based receiver to compensate for poor local oscillator performance in the radio portion of the OFDM-based receiver and transmitter and improve frequency tracking in general.

In one embodiment, the invention can be characterized as a pilot phase tracking loop for an orthogonal frequency division multiplexed (OFDM) receiver including a phase rotator for receiving and phase de-rotating an incoming signal, a fast Fourier transform coupled to an output of the phase rotator for processing a signal output from the phase rotator and a pilot phase error metric including a discrete Fourier transform portion. The discrete Fourier transform portion is coupled to the output of the phase rotator. The pilot phase error metric determines a phase error estimate associated with a received OFDM symbol of the signal output from the phase rotator. Also included are a loop filter coupled to an output of the pilot phase error metric and an oscillator coupled to an output of the loop filter. The oscillator has an output coupled to the phase rotator such that the phase rotator adjusts the phase of subsequent OFDM symbols of the incoming signal arriving after the received OFDM symbol by the phase error estimate.

In another embodiment, the invention can be characterized as a method of pilot phase tracking in an orthogonal frequency division multiplexed (OFDM) receiver comprising the steps of: receiving a baseband signal corresponding to an OFDM preamble waveform at a discrete Fourier transform portion of the OFDM receiver, wherein the discrete Fourier transform is a separate processing operation than a fast Fourier transform of the OFDM receiver; determining pilot reference points corresponding to a plurality of pilots of an OFDM preamble waveform; receiving a baseband signal corresponding to an OFDM symbol at the discrete Fourier transform portion; determining complex signal measurements corresponding to each of the plurality of pilots of the OFDM symbol; determining a phase error estimate corresponding to the OFDM symbol based on the pilot reference points and the complex signal measurements; filtering the phase error estimate; and rotating a phase of an incoming signal corresponding to subsequent OFDM symbols to be received at the fast Fourier transform after the OFDM symbol by a filtered phase error estimate; wherein a phase noise of the incoming signal corresponding to the subsequent OFDM symbols to be received at the fast Fourier transform is reduced.

In yet another embodiment, the invention can be characterized as a method of pilot phase tracking in an orthogonal frequency division multiplexed (OFDM) receiver comprising the steps of: receiving a signal representing an OFDM waveform at a discrete Fourier transform portion of the OFDM receiver, wherein the discrete Fourier transform is a separate processing operation than a fast Fourier transform of the OFDM receiver that also receives the signal; determining a phase error estimate corresponding to an OFDM symbol of the OFDM waveform; filtering the phase error estimate; and rotating a phase of the signal for subsequent OFDM symbols to be received at the fast Fourier transform after the OFDM symbol by the filtered phase error estimate, wherein a phase noise of the signal for the subsequent OFDM symbols to be received at the fast Fourier transform is reduced.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
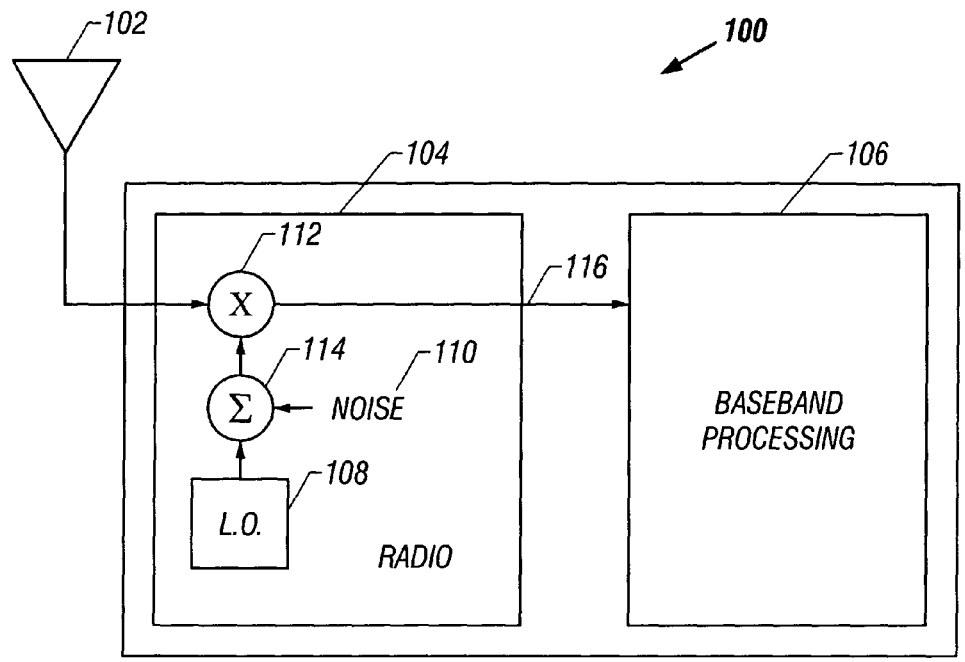
FIG. 1 is a block diagram of an orthogonal frequency division multiplexed (OFDM) receiver illustrating a phase noise contribution of the local oscillators (LO) of the radio portion of the OFDM receiver, and in which one or more embodiments of the invention may be practiced.

Referring first to FIG. 1, a block diagram is shown of an orthogonal frequency division multiplexed (OFDM) receiver illustrating the phase noise contribution of the local oscillators (LO) of the radio portion of the OFDM receiver, and in which one or more embodiments of the invention may be practiced. The OFDM receiver 100 (also referred to as the receiver 100) includes an antenna 102, a radio portion 104 and a baseband processing portion 106. The radio portion 104 includes local oscillators, shown collectively as local oscillator 108 (hereinafter referred to as LO 108), which introduces phase noise, shown as noise 110, into the receiver 100. The noise 110 is summed with the signals from the local oscillator 108 (illustrated at summer 114) and multiplied with the received signal at mixer 112. As is common, the received signal is converted from RF (radio frequency) to an incoming signal 116 (also referred to as a "baseband/IF signal") sent to the baseband processing portion 106. The incoming signal 116 may be a baseband signal (also referred to as a "baseband I/Q signal"). In some embodiments, the incoming signal 116 may be an intermediate frequency signal (also referred to as an IF signal) which is converted to baseband in the baseband processing portion 106. The frequency translation from RF to baseband can be done in multiple steps of frequency conversions. As such, the incoming signal 116 includes phase noise 110 as introduced by the LO 108 of the radio portion 104 of the OFDM receiver 100. In reality, the incoming signal 116 will also include phase noise as introduced by the local oscillators at the OFDM transmitter that transmits the OFDM signal to the receiver 100 as well as other noise introduced by the channel, e.g., changes in the multipath, movements of the receiver and transmitter relative to each other, and thermal noise.

One solution to reducing the phase noise contribution of the LO 108 is to design a radio portion 104 having good phase noise performance characteristics. However, in such an implementation where the radio portion 104 and the baseband processing portion 106 are integrated into one or more devices (i.e., chips), the design of such a radio portion 104 is difficult and costly, particularly as higher order modulations are used.

In accordance with one embodiment of the invention, the specifications of the radio portion 104 are relaxed such that a certain amount of phase noise 110 introduced by the LO 108 is acceptable. Advantageously and according to one embodiment, the phase noise 110 introduced by the LO 108 is compensated for by the baseband processing portion 106 of the OFDM receiver 100. Thus, the baseband processing portion 106 works to effectively relax the phase noise performance requirements of the radio portion 104, which allows the radio portion 104 to be designed anticipating the poorer phase noise performance. Thus, the radio portion 104 can be implemented more easily and inexpensively. The key to such embodiments is understanding the relationship between both the radio portion 104 and the baseband processing portion 106. A typical approach might be to optimally design the radio portion 104 and then optimally design the baseband processing portion 106. Such an approach leads to a complex and expensive radio portion 104 requiring good phase noise performance. That is, the phase noise introduced by the LO 108 does not need to be further corrected and is sufficient to support signaling at the specified modulations. However, as the modulation constellation increases, for example, moving from 16-QAM to 64-QAM to 256-QAM, less and less phase noise introduced by the LO 108 can be tolerated. Otherwise, with such higher-order constellations, the same phase noise introduced by the LO 108 is more likely to result in constellation points being confused. Thus, as the modulation constellation increases, the specifications of the radio portion 104 become increasingly more stringent. Thus, a radio portion 104 with good phase noise performance becomes more difficult and expensive to implement as the constellation complexity increases.

However, by relaxing the requirements of the radio portion 104 such that the radio portion 104 contributes phase noise 110 that might otherwise result in constellation point errors (possibly resulting in an unacceptable symbol error rate), a simpler and less expensive radio portion is implemented. Furthermore, advantageously the phase noise contribution of the LO 108 is tracked and removed using a pilot tracking loop employing a maximum likelihood estimator in the baseband processing portion 106 of the receiver 100. Thus, the baseband processing portion 106 effectively reduces the phase noise contribution of the LO 108 of the radio portion 104 without requiring that the radio portion 104 have good phase noise performance. Thus, the baseband processing portion 106 and the radio portion 104 are designed together to provide an integrated OFDM receiver 100 that is more easily implementable on a single device and that can support many symbol by symbol modulations, such as MPSK or M-ary QAM, e.g., constellations of 64-QAM or higher.

Further details regarding the specific techniques of using the baseband processing portion 106 to effectively reduce the phase noise contribution of the LO 108 of the radio portion 104 are described below.

Figure 2:
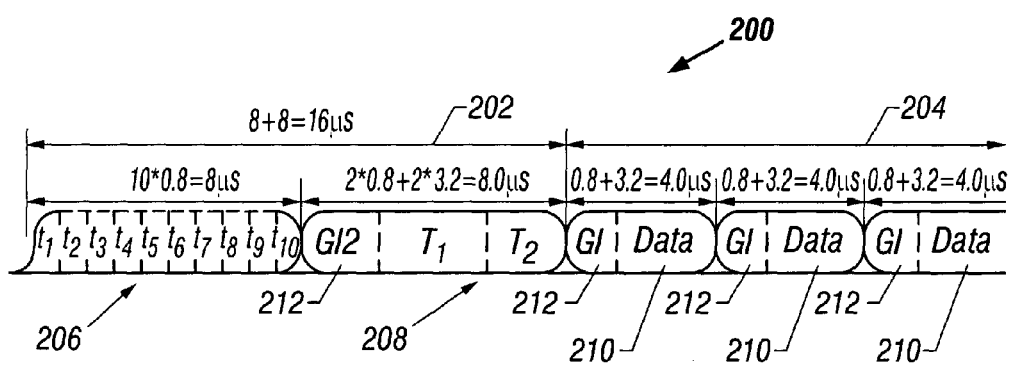
FIG. 2 is a diagram of the PHY-layer frame structure for the IEEE 802.11a standard used in OFDM communications, for example, by the OFDM receiver of FIG. 1.

Referring next to FIG. 2, a diagram is shown of the PHY-layer frame structure for the 802.11a standard used in OFDM communications, for example, by the OFDM receiver 100 of FIG. 1. Shown is a frame 200 having a preamble 202 and a data portion 204. The preamble 202 includes a short symbol portion 206 including 10 short symbols ($t_1$-$t_{10}$) and a long symbol portion 208 including two long symbols ($T_1$ and $T_2$). The data portion 204 includes multiple data symbols 210 (also referred to as OFDM symbols or simply symbols). Each long symbol $T_1$ and $T_2$ and each data symbol 210 having a guard time interval 212 preceding it. The frame 200 is also referred to as a PHY-layer frame or a medium access control (MAC) frame.

According to these standards, the preamble 202 is chosen which is well suited to measuring frequency errors quickly in the communication system, but is substantially less ideal for measuring precision time of signal arrival. As is well known in the art, the short symbol portion 206 is used for signal detection, diversity selection, coarse frequency offset estimation, and timing synchronization. The long symbol portion 208 is used for channel estimation and fine frequency offset estimation. Following the preamble 202, each OFDM symbol 210 consists of a properly time-windowed set of modulated subcarriers (e.g., sine waves) and a guard time interval 212. As is well known in the art, this guard time interval 212 is utilized to allow the communication channel's transient to decay before transmitting the next OFDM symbol 210. According to the IEEE 802.11a standard, this guard time interval 212 is 0.8 μs and the symbol 210 length is 3.2 μs. Note that the guard time interval in the long symbol portion 208 is twice the duration of that preceding each data symbol 210, i.e., 1.6 μs. According to the HiperLAN2 standard, the guard time interval 212 is selectable between 0.4 μs or 0.8 μs while the symbol 210 length is 3.2 μs. As such, the guard time interval 212 is long enough such that all reflections of the transmitted symbol 210 are adequately reduced prior to transmission of the next OFDM symbol 210.

As is well known in the IEEE 802.11a and the HiperLAN2 waveforms, each symbol, whether the data symbol 210 or one of the long symbols $T_1$ and $T_2$, includes 48 data bearing subcarriers and a plurality of pilot subcarriers (also referred to as "pilot tones" or simply as "pilots") buried within the signal that do not transport data, e.g., 4 pilots in the IEEE 802.11a and HiperLAN2 waveforms. According to the IEEE 802.11a standard, these pilots occupy subcarrier positions ±7 ΔF and ±21 ΔF of each symbol. As such, the phase behavior of the pilots is precisely known aside from channel related impairments and LO phase noise. Since the phase noise imposed on these pilot tones is the same phase noise that is imposed upon all of the subcarriers, it is possible to mitigate much of the LO phase noise by phase tracking these pilots. However, since finite signal-to-noise ratio (SNR) at the OFDM receiver input also contributes phase noise to all of the subcarriers, the effective noise bandwidth of the tracking algorithm can not be made arbitrarily large. Rather, the bandwidth of the tracking algorithm is based upon a compromise between LO-related phase noise suppression and additive noise due to the finite input SNR.

According to one embodiment of the invention, during the long symbols $T_1$ and $T_2$ of the long symbol portion 208, complex signal measurements are taken for each pilot tone and stored in rectangular form as a respective pilot reference point for each pilot tone of the MAC frame 200. Then, a pilot phase error metric of a pilot tracking loop processes complex signal measurements for all of the pilots of each subsequent data symbol 210 along with the pilot reference points to produce an estimate of the aggregate phase error of the current OFDM data symbol as compared to the actual phase at the beginning of the MAC frame 200. The pilot phase error metric is based on a maximum likelihood estimation approach in how the complex signal measurements of the pilots and the pilot reference points are combined. Advantageously, this embodiment estimates the aggregate phase error of the data symbol without having to explicitly calculate the amplitude and phase of the individual pilots in the long symbol portion 208 or calculate the amplitude and phase of the individual pilots of each data symbol 210. Next, the estimation of the aggregate phase error of the current data symbol is then fed back through a loop filter and used to rotate the phase of the incoming baseband IQ signal for the next OFDM data symbols so that they will be received with an improved phase error. This maximum likelihood estimation-based approach in the pilot phase error metric is a departure from conventional methods in that it tracks the pilot aggregate of the data symbols, rather than only tracking the strongest of the plurality of pilots of the data symbols. Thus, the maximum likelihood pilot phase error metric compensates for the poor phase noise performance of the radio portion of the OFDM receiver. A natural by-product of the maximum likelihood metric is that it also maximizes the effective SNR for the pilot symbols considered as a whole. The additional SNR permits greater suppression of the LO phase noise by these disclosed techniques. The maximum likelihood formulation automatically adjust the effective contribution made by each pilot even in the presence of frequency selective fading, delivering the lowest variance phase error estimate possible.

Figure 3:
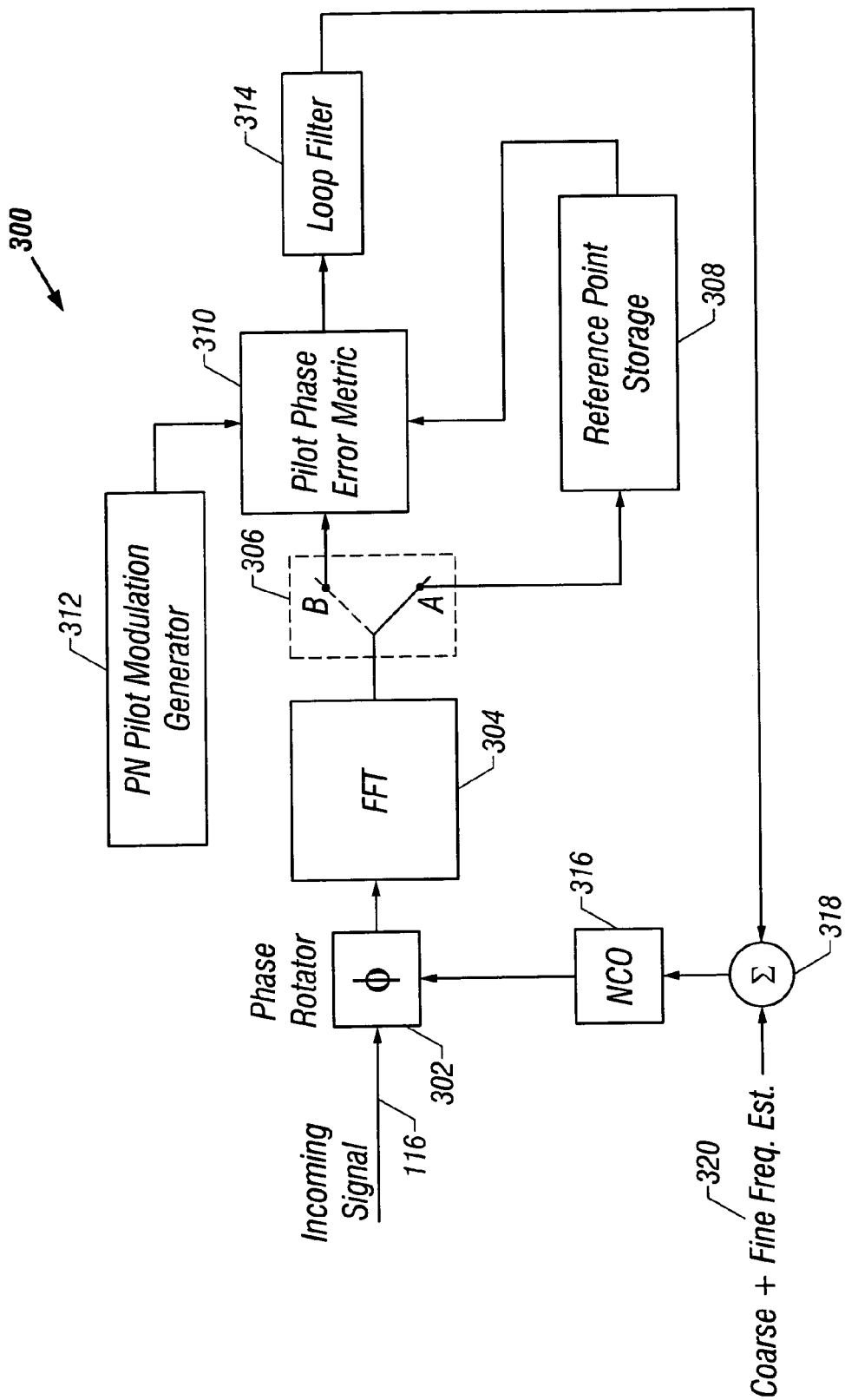
FIG. 3 is a functional block diagram of a pilot tracking loop of a baseband processing portion of the OFDM receiver of FIG. 1, which utilizes a pilot phase error metric based on a maximum likelihood estimation approach for estimating the phase error of the OFDM data symbols in accordance with one embodiment of the invention.

Referring next to FIG. 3, a functional block diagram is shown of a pilot tracking loop 300 of the baseband processing portion of the OFDM receiver of FIG. 1, which utilizes a pilot phase error metric based on a maximum likelihood estimation approach for estimating the phase error of OFDM data symbols in accordance with one embodiment of the invention. Shown is the incoming signal 116 (which may be a baseband signal or an IF signal, for example), a phase rotator 302, an FFT 304 (fast Fourier transform, which may be referred to generically as a "Fourier transform"), a switch 306 having positions A (solid line) and B (dashed line), a reference point storage 308, a pilot phase error metric 310, a pseudo random pilot modulation generator 312 (hereinafter referred to as a PN pilot modulation generator 312), a loop filter 314, a summation 318, a coarse and fine frequency estimate signal 320 and an NCO 316 (numerically controlled oscillator, which may be referred to generically as an "oscillator").

The incoming signal 116 is input to the phase rotator 302. The phase rotator 302 is coupled to the FFT 304, which is coupled to the switch 306. In position A, the switch 306 is coupled to the pilot reference storage 308, which is coupled to the pilot phase error metric 310. In position B, the switch 306 is directly coupled to the pilot phase error metric 310. The PN pilot modulation generator 312 is also coupled to the pilot phase error metric 310. Additionally, the loop filter 314 couples the pilot phase error metric 310 to the NCO 316 via the summation 318 and the NCO 316 is coupled back to the phase rotator 302. The summation 318 sums the output of the loop filter 314 with the coarse and fine frequency estimate signal 320, which is then output to the NCO 316.

In operation, the pilot tracking loop 300 (also referred to as a phase-locked loop) is used to track the phase changes of all of the plurality of pilots for each symbol in order to correct or minimize the phase error for subsequent data symbols relative to the reference points measured, for example, during the preamble. Initially, the pilot tracking loop determines reference points for each of the respective pilots since the amplitudes and phases of the received pilots are completely unknown and may vary from pilot to pilot within each symbol due to the multipath and the time of arrival. In one embodiment, the pilots of the long symbols $T_1$ and $T_2$ of the OFDM preamble waveform are used to determine the reference points. As such, when the long symbols of the incoming signal 116 pass through the phase rotator 302, they are unchanged in phase since the pilot tracking loop is not yet activated, i.e., the switch 306 is in position A. During the long symbol portion of the preamble, a channel estimate is made by the FFT 304 and saved, e.g., the complex signal measurements I+jQ for each pilot are extracted at the FFT 304 and saved in the reference point storage 308. The reference points for each pilot are saved in rectangular form as $u_k$ and $v_k$ (where k=0, 1, 2 and 3), which represent the I (in-phase) and Q (quadrature) values, respectively, for each pilot tone. During this time (i.e., when the switch 306 is in position A), the NCO 316 is preset to the proper initial conditions and the loop filter 314 updating is disabled.

After the pilot reference points $u_k$ and $v_k$ are determined for each pilot using the FFT 304, the subsequent data symbols of the incoming signal 116 are processed by the FFT 304 one at a time. The switch 306 is now moved to position B, which activates the pilot tracking loop. The outputs of the FFT 304, i.e., complex signal measurements, corresponding to each of the pilots of the current data symbol are input to the pilot phase error metric 310 which is based upon a maximum likelihood estimation approach using each of the pilots of the data symbol as compared to the respective stored reference points $u_k$ and $v_k$ for each pilot. The result of the pilot phase error metric 310 is an aggregate phase error estimate over the respective data symbol. As previously mentioned, in this embodiment, the pilot phase error metric 310 advantageously uses all of the pilots to produce its estimate. It is important that all of the pilots of each data symbol are tracked in order to mitigate the effect of frequency selective fading over the frequency range of the OFDM data symbol.

The loop filter 314 is updated based upon the output of the pilot phase error metric 310. Since the pilot phase error metric 310 and the loop filter 314 track relatively small frequencies, the coarse/fine frequency estimate signal 320 (obtained from the channel estimation process during the long symbols of the preamble at another portion of the OFDM receiver) is summed with the output of the loop filter 314 at summation 318. Thus, the loop filter 314 then modifies the NCO 316 which causes the phase rotator 302 to de-rotate the incoming signal 116 to keep the aggregate phase error as low as possible. The loop filter 314, summation 318 and the NCO 316 are well known components that may be found in many phase-locked loops as known in the art.

Additionally, as is well known, the PN pilot modulation generator 312 provides the pseudo random number sequence to remove the random BPSK (binary phase shift keying) modulation applied to each of the pilot tones as given in the IEEE 802.11a standard.

The pilot tracking loop 300 includes phase rotator 302 for receiving and phase de-rotating the incoming signal 116, the switch 306, the reference point storage 308, the pilot phase error metric 310, the loop filter 314, and the NCO 316 while advantageously utilizing the FFT 304 which is required within the OFDM receiver. It is also noted that in this embodiment, the phase rotator 302 is provided before the FFT 304 in the receiver such that the phase error is corrected prior to the FFT 304 operation. In the event the incoming signal 116 comprises an IF signal, the phase rotator also converts this IF signal to a baseband signal or a baseband I/Q signal. Thus, whether the incoming signal 116 is a baseband signal or an IF signal, the output of the phase rotator is a baseband signal.

Figure 4:
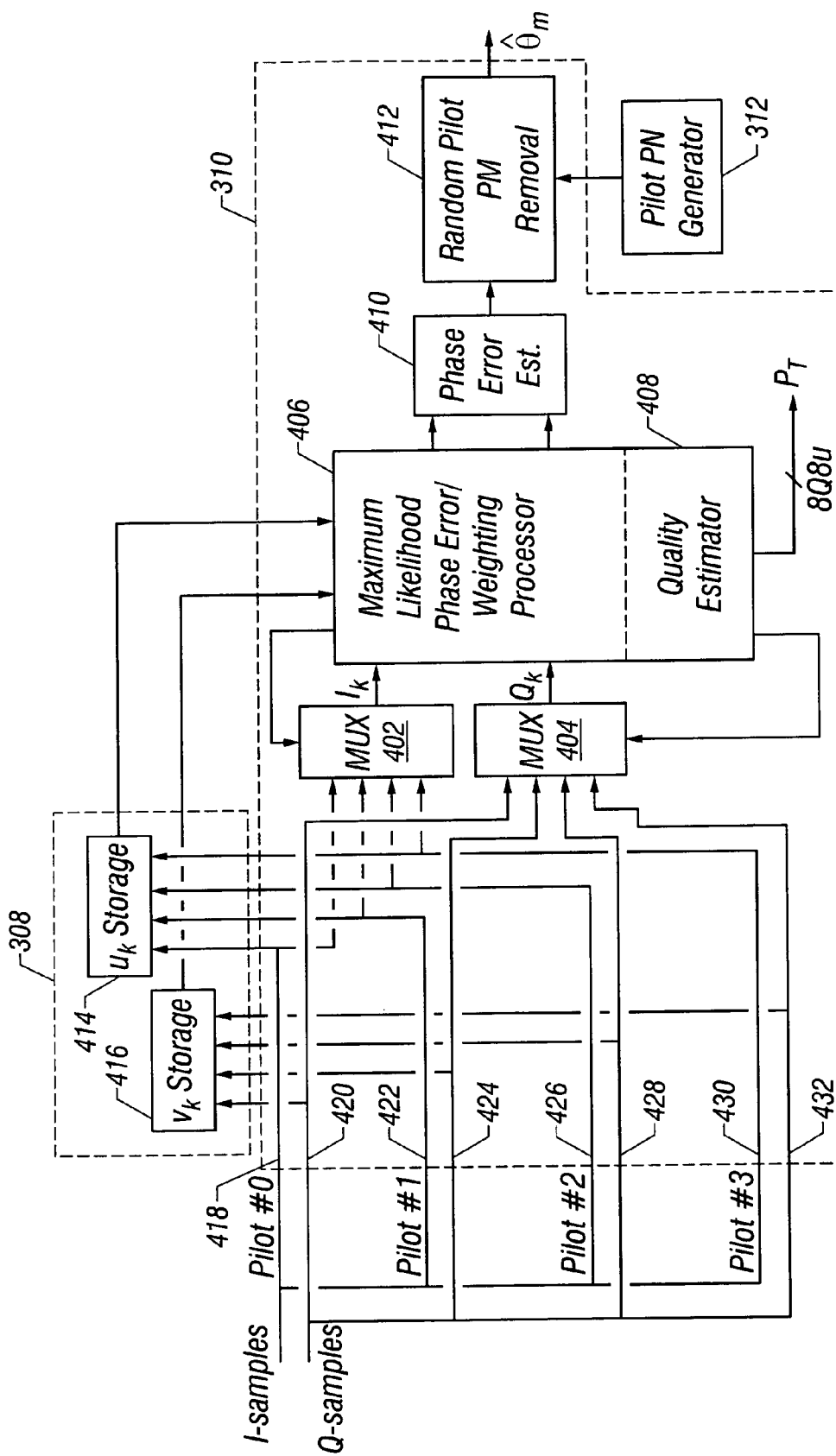
FIG. 4 is a functional block diagram of a pilot phase error metric of the pilot tracking loop of FIG. 3 which is based upon maximum likelihood estimation in accordance with one embodiment of the invention.

Referring next to FIG. 4, a functional block diagram is shown of the pilot phase error metric of the pilot tracking loop of FIG. 3 which is based upon maximum likelihood estimation in accordance with one embodiment of the invention. Shown is the pilot phase error metric 310 including multiplexers 402 and 404, a maximum likelihood phase error/weighting processor 406, a quality estimator 408, a phase error estimator 410, and a random pilot modulation removal 412. Also shown are the PN pilot modulation generator 312 and the reference point storage 308 which includes a $u_k$ storage 414 and a $v_k$ storage 416. Input I and Q samples from the FFT 304 for the respective pilots of the OFDM data symbols are illustrated as signals 418 and 420 for pilot #0, signals 422 and 424 for pilot #1, signals 426 and 428 for pilot #2, and signals 430 and 432 for pilot #3.

Again, as the long symbol portion of the incoming baseband signal is processed by the FFT, the frequency bins of the FFT that correspond to the four pilots of the long symbols are saved as $u_k$ and $v_k$ within the $u_k$ storage 414 and the $v_k$ storage 416, where k=0, 1, 2 and 3. Thus, $u_k$ and $v_k$ are complex signal measurements in rectangular form for each pilot that represent the reference points in IQ space for each of the four pilots (i.e., pilot #0, pilot #1, pilot #2 and pilot #3). These pilot reference points are saved for use in the maximum likelihood phase error/weighting processor 406.

The information from the FFT operation can be represented as $A_k$ (amplitude of the $k^{th}$ pilot subcarrier) and $\theta_k$ (phase of the $k^{th}$ pilot subcarrier). If the discontinuous nature of the OFDM symbol subcarriers is ignored, the $k^{th}$ pilot tone can be represented as:

$$r_k(t) = A_k s_k(t) e^{j\theta_k(t)} + n_k(t) \qquad \text{Eq. (1)}$$

where $r_k(t)$ is the received signal, $s_k(t)$ is the transmitted signal and $n_k(t)$ represents complex Gaussian noise having a two-sided power spectral density of $N_o/2$ W/Hz. Thus, the beginning of the pilot-bearing OFDM signal train for a given OFDM symbol and pilot tone is represented as:

$$r_k(0) = A_k s_k(0) e^{j\theta_k(0)} + n_k(0) = u_k + jv_k \qquad \text{Eq. (2)}$$

Next, after having stored the reference points, the pilot phase tracking loop is activated, e.g., the switch 306 of FIG. 3 is moved to position B. During the subsequent data portion of the MAC frame, each $r_k(t)$ changes with time from data symbol to data symbol over the frame structure. Generally, it is desired to track the pilots having a larger amplitude because they are less influenced by the additive Gaussian noise of the receive channel, and also the channel phase near frequency-selective spectrum nulls will be erratic. Thus, the sampled tracking loop tracks the nominal pilot subcarrier phase departure from the phase of the reference point at the beginning of the frame structure for each pilot.

As such, the pilot tracking loop is activated and the complex signal measurements (Is and Qs) from the FFT corresponding to each of the respective pilots #0 through #3 for each subsequent data symbol are coupled to the respective one of multiplexers 402 and 404 to be input into the maximum likelihood phase error/weighting processor 406. It is noted that the pilot reference points are stored in rectangular form as $u_k$ and $v_k$ and that the amplitude and phase of each of the pilot reference points is not actually calculated. It is also noted that the subsequent data symbol by data symbol complex signal measurements of the in-phase and quadrature terms for the same pilot tones during the rest of the burst reception are labeled as $I_{k,m}$ and $Q_{k,m}$, where m is the data symbol time index. For example, the $I_{k,m}$ values from the FFT operation for each data symbol are coupled to multiplexer 402 while the $Q_{k,m}$ values from the FFT operation for each data symbol are coupled to multiplexer 404. The multiplexers 402 and 404 function to buffer the $I_{k,m}$ and $Q_{k,m}$ values to the maximum likelihood phase error/weighting processor 406. Thus, the maximum likelihood phase error/weighting processor 406 serially processes one set of $I_{k,m}$ and $Q_{k,m}$ values at a time such that redundant gates are not required to simultaneously perform the steps in the maximum likelihood phase error/weighting processor 406 in parallel.

The initial relative phase of each pilot subcarrier at the beginning of the frame can be largely removed by modifying $r_k(t)$ of Eq. (1) for t>0 per $$rm_k(t) = r_k(t) e^{-j\theta_k(0)} \qquad \text{Eq. (3)}$$

where $rm_k(t)$ represents the $k^{th}$ pilot after removal of the phase initial estimate for the particular pilot during the long symbol portion of the preamble. Substituting Eq. (3) in Eq. (1):

$$n_k(t) = rm_k(t) - A_k s_k(t) e^{j[\theta_k(t) - \theta_k(0)]} \qquad \text{Eq. (4)}$$
$$= rm_k(t) - A_k s_k(t) e^{j\varphi_e(t)}$$

where $\phi_e$ is the actual pilot phase error of the $k^{th}$ pilot of the data symbol relative to the pilot reference point, which is not explicitly calculated, but is assumed to be the same for all of the pilots of a given data symbol. In the OFDM waveform, the MAC frame time duration is purposely chosen such that the channel characteristics change very little over an individual MAC frame. Therefore, for a specific MAC frame, it is assumed that $|A_k s_k(t)| = A_k$, a constant. Thus, while the amplitudes of the individual pilots may be different from each other, the amplitude of each pilot ($A_k$) from symbol to symbol will stay approximately constant over the course of the MAC frame. Since the pilot tracking loop of this embodiment primarily tracks phase rather than signal amplitude, some error in signal amplitude is acceptable.

The probability density function for an individual noise sample $n_k$ is given by $$pdf(n_k) = \frac{1}{2\pi\sigma^2} \exp\left\{-\frac{n_{kc}^2 + n_{ks}^2}{2\sigma^2}\right\} \qquad \text{Eq. (5)}$$

where $n_{kc}$ and $n_{ks}$ are the real and imaginary parts of the $k^{th}$ bin noise sample $n_k$ and $\sigma$ is the standard deviation of the Gaussian noise. Computing the log-likelihood function from Eq. (5), and then maximizing it, the maximum-likelihood estimator for the actual pilot phase error $\theta$ for a data symbol is given by:

$$\hat{\theta} = \tan^{-1}\left\{\frac{\sum_k A_k \text{Im}(rm_k)}{\sum_k A_k \text{Re}(rm_k)}\right\} \qquad \text{Eq. (6)}$$

where $\hat{\theta}$ is the estimate of the aggregate pilot phase error of a data symbol relative to the reference points looking at all of the pilots of the data symbol together.

Generally, the sum $$\sum_k A_k^2$$

will be nearly equal to a constant due to the AGC (automatic gain control) action that precedes the A/D converter in the baseband processing portion. If the receive channel is flat (i.e., no frequency selective fading present), then the $A_k$ terms will all have the same value and Eq. (6) reduces to the classical maximum-likelihood estimator that is commonly seen for carrier phase.

In rectangular form instead of polar form, the complex signal measurements corresponding to the $k^{th}$ pilot of the $m^{th}$ data symbol are represented as:

$$r_{k,m} = I_{k,m} + jQ_{k,m} \qquad \text{Eq. (7)}$$

where k=0, 1, 2 and 3. The phase rotation for the $k^{th}$ pilot that must be applied to remove the phase argument as computed by the channel estimation process (i.e., the storage of $u_k$ and $v_k$) can be expressed as:

$$e^{-j\theta_k(0)} = \frac{u_k - jv_k}{\sqrt{u_k^2 + v_k^2}} \qquad \text{Eq. (8)}$$

where $e^{-j\theta_k(0)}$ is found in Eq. (3). Thus, $rm_{k,m}$ for the $m^{th}$ data symbol becomes:

$$rm_{k,m} = (I_{k,m} + jQ_{k,m})\left(\frac{u_k - jv_k}{\sqrt{u_k^2 + v_k^2}}\right) \qquad \text{Eq. (9)}$$

where $rm_{k,m}$ represents the signal measurement of the $k^{th}$ pilot after removal of the phase initial estimate, which is not explicitly calculated.

According to this embodiment of the maximum likelihood estimation based approach which tracks all of the pilots of the OFDM data symbol, each pilot signal contribution of Eq. (9) is then weighted by the signal amplitude $A_k$ of the $k^{th}$ pilot. Even though the amplitudes $A_k$ are time varying, they generally do not vary over the duration of the MAC frame such that $A_k(t)$ approximates the $A_k$ measurement at the beginning of the MAC frame, e.g., from the reference points $u_k+jv_k$ of the long symbol duration. Thus, the amplitude to weight each of the pilot contributions is given by:

$$A_k(t) \approx A_k(0) = \sqrt{u_k^2 + v_k^2} \qquad \text{Eq. (10)}$$

Multiplying Eq. (9) by Eq. (10), the quantity $A_k rm_{k,m}$ is a complex signal given by:

$$A_k rm_{k,m} = [u_k I_{k,m} + v_k Q_{k,m}] + j[u_k Q_{k,m} - v_k I_{k,m}] \qquad \text{Eq. (11)}$$

Summing the each of the complex signals $A_k rm_{k,m}$ for the k pilots produces a complex composite signal looking at all of the pilots of a data symbol together and is given by:

$$\sum_{k=0}^{3} A_k rm_{k,m} = \sum_{k=0}^{3} \left[(u_k I_{k,m} + v_k Q_{k,m}) + j(u_k Q_{k,m} - v_k I_{k,m})\right] \qquad \text{Eq. (12)}$$

Thus, based upon Eq. (6), the aggregate phase error estimate for the $m^{th}$ data symbol, $\hat{\theta}_m$, is the argument of the complex composite signal for all pilots together, $$\sum_{k=0}^{3} A_k rm_{k,m},$$

which is represented mathematically by:

$$\hat{\theta}_m = \arg\left(\sum_{k=0}^{3} A_k rm_{k,m}\right) \qquad \text{Eq. (13)}$$

It is noted that Eq. (13) must be adjusted to deal with the random bi-phase modulation of the pilot subcarriers during the frame; however, the quantity in Eq. (13) is the estimate that is produced by the pilot phase error metric, and is further shown in more detail below as Eq. (14).

The argument of the complex composite signal (i.e., Eq. (13)) is determined by the phase error estimator 410 and is based upon the maximum likelihood estimation approach of Eq. (6), which is re-written below in Eqs. (14) through (16). Preferably, using a cordic-based arctangent method on the real and imaginary parts of the complex composite signal in the phase error estimator 410, the output of the phase error estimator 410 is given by Eq. (14). In alternative embodiments, making use of the small angle approximation within the phase error estimator 410, Eq. (14) can be recast as Eqs. (15) and (16):

$$\hat{\theta}_m = \tan^{-1}\left[\frac{\sum_{k=0}^{3}(u_k Q_{k,m} - v_k I_{k,m})}{\sum_{k=0}^{3}(u_k I_{k,m} + v_k Q_{k,m})}\right] \qquad \text{Eq. (14)}$$

$$\cong \sin^{-1}\left[\frac{\sum_{k=0}^{3}(u_k Q_{k,m} - v_k I_{k,m})}{\sum_{k=0}^{3}(u_k I_{k,m} + v_k Q_{k,m})}\right] \qquad \text{Eq. (15)}$$

$$\approx \frac{\sum_{k=0}^{3}(u_k Q_{k,m} - v_k I_{k,m})}{\sum_{k=0}^{3}(u_k I_{k,m} + v_k Q_{k,m})} \qquad \text{Eq. (16)}$$

where $\hat{\theta}_m$ is the aggregate phase error of the $m^{th}$ data symbol relative to the pilot reference points at the beginning of the OFDM MAC frame. Thus, the maximum likelihood/weighting processor 406 calculates the quantities in the numerator and the denominator of Eqs. (14) through (16) while the quantity $\hat{\theta}_m$ of Eqs. (14) through (16) is determined in the phase error estimator 410. The quantities in the numerator and the denominator or Eqs. (14) through (16) are weighted averages producing composite I and Q signals that represent the deviation of the pilots of the current data symbol compared to the reference points measured at the beginning of the frame.

With the AGC present and the fact that the actual pilot phase error $\theta$ for a data symbol will be kept small by the pilot tracking loop, it can suffice to use the small angle approximation and use only the numerator portion of Eq. (6) for the pilot tone phase error metric as $$\hat{\theta} \approx \sum_{k} A_k \text{Im}(rm_k) \qquad \text{Eq. (17)}$$

Again, it is noted that the random bi-phase modulation applied to the pilots at the OFDM transmitter is removed by the random pilot modulation removal 412, which uses a pseudo random sequence which is known a priori from the PN pilot modulation generator 312. Thus, the output of the random pilot modulation removal 412 is the aggregate phase error of the processed data symbol, $\hat{\theta}_m$.

As previously described, the multiplexers 402 and 404 buffer the I and Q samples for each pilot of the symbol received from the FFT operation. Thus, when the maximum likelihood phase error/weighting processor 406 calculates the numerator and denominator of Eqs. (14) through (16), it only processes one pilot at a time. This reduces the overall gate count in a design implemented in a chip. However, it is noted that redundant gates may be used in place of the multiplexers 402 and 404 in other embodiments. Additionally, all calculations done within the maximum likelihood phase error/weighting processor 406 are done in rectangular form, instead of in polar form, for simplification reasons.

As shown above, advantageously, the pilot phase error metric 310 does not actually calculate the amplitude or phase of the individual pilot reference points, nor does it calculate the amplitude and phase of individual pilots of each subsequent data symbol. Likewise, the pilot phase error metric 310 does not actually calculate the relative phase error of individual pilots of each data symbol compared to each pilot reference point. The pilot phase error metric 310 advantageously uses pre-signal detection combining techniques to combine the complex signal measurements (from the FFT operation) of the pilots to be used as the pilot reference points and the complex signal measurements of the pilots of each subsequent data symbol in such a way that a complex composite signal is generated prior to signal detection. This complex composite signal represents a weighted pilot phase error for the aggregate of the pilots of the $m^{th}$ data symbol relative to the pilot reference points. Thus, the maximum likelihood phase error/weighting processor 406 determines the composite signals for the numerator and denominator of Eq. (14).

Furthermore, the phase error estimator 410 performs the signal detection by computing the arctangent in Eq. (14) to obtain the aggregate phase error for the $m^{th}$ data symbol. Thus, by advantageously combining the complex signal measurements in the maximum likelihood phase error/weighting processor 406 prior to the signal detection in the phase error estimator 410, a processing gain of approximately $10\log_{10} n$ (where n is the number of pilots) is realized in comparison to performing signal detection on each individual pilot of the data symbol and then averaging them to obtain the aggregate phase error of the data symbol, e.g., approximately 6 dB in the 4 pilot case. In other words, signal detection on the individual pilots would amount to estimating the amplitude and phase of each pilot of the data symbol in order to determine a phase error for each pilot and then averaging the phase errors to determine the aggregate phase error for the entire data symbol. Thus, in one embodiment, the pilot phase error metric 310 performs pre-signal detection combining.

Additionally, as described above, the phase error estimator 410 determines the phase angle of the aggregate phase error $\hat{\theta}_m$ or phase noise of the signaling, a potentially large portion of which is due to the phase noise contribution of the LO of the radio portion of the OFDM receiver. A preferred, approach is to use a cordic-based arctangent method (see Eq. (14)) and an alternative approach is to use a small angle approximation (see Eq. (16)). The cordic-based arctangent approach does not require large bit-width multiplications. It only shifts and adds. The small angle approximation should be faster than the cordic-based arctangent approach, but it involves large bit width multiplication or division and is more prone to difficulties with the numerical dynamic range.

In one embodiment, the cordic-based arctangent approach is implemented such that the cordic iteration is performed between 8 and 15 times. Cordic-based arctangent methods are well known in the art, thus, no further explanation is required.

Thus, the pilot phase error metric 310 advantageously provides a maximum likelihood estimation based approach for the pilot phase error relative to the pilot reference points for all of the pilots of the OFDM symbols. According to one embodiment, it is important to track all of the pilots to reduce the effects of frequency selective fading across the OFDM symbols and reduce the variance of the estimator as well. For example, the phase may not change uniformly for all of the pilots as the channel conditions change. A single pilot may have the strongest SNR (e.g., the highest amplitude) and its phase changes noticeably from symbol to symbol; however, the phase of the other pilots may remain unchanged, or have changed only slightly, from symbol to symbol. These other pilots may also continue to have a lower amplitude than the amplitude of the strongest pilot. As such, due to frequency selective fading, the strongest pilot does not accurately reflect the phase characteristics of the entire OFDM data symbol. However, by tracking and performing a maximum likelihood based estimation using all of the pilots, a more accurate picture of the signal phase across the OFDM symbol is estimated such that the phase contribution due to the multipath and also introduced by the LO of the OFDM radios can be minimized. Furthermore, by keeping the phase error minimized, it is possible to use higher order modulations, such as M-ary QAM, e.g., 64-QAM or 256-QAM, without severe performance degradation. It is noted that several of the embodiments of the invention will reduce this phase error for many symbol by symbol modulations, such as MPSK and M-ary QAM.

Further advantageously, a natural by-product of the maximum likelihood metric of this embodiment is that it also maximizes the effective SNR for the pilot symbols considered as a whole. The additional SNR allows enhanced phase noise tracking resulting in greater suppression of the LO phase noise.

Additionally, the quality estimator 408 calculates a measure of the pilot tracking loop's quality, which is required elsewhere in the signal processing of the OFDM receiver. A convenient measure is the total power present in the 4 pilot subcarriers of each symbol given by:

$$P_T = \sum_{k=0}^{3} [u_k^2 + v_k^2] \quad \text{Eq. (18)}$$

Note that the quality estimator 408 may be integrated with the maximum likelihood phase error/weighting processor 406.

It is noted that Eqs. (12) through (16) and Eq. (18) are specifically for a waveform having 4 pilots (k=0, 1, 2 and 3); however, these equations may be written more generally for a waveform having n pilots with the summation term expressed as $$\sum_{k=0}^{n-1}.$$

Figure 5:
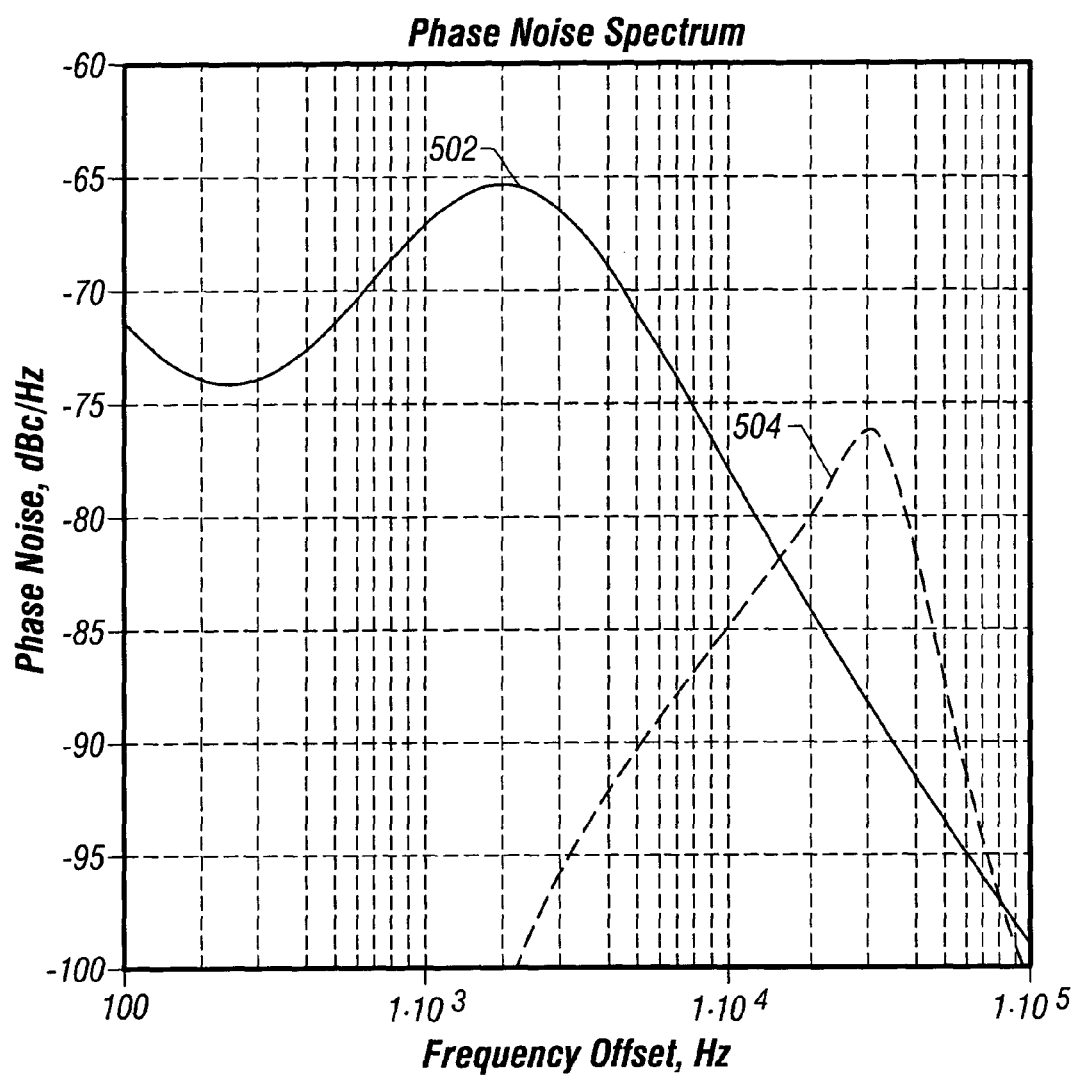
FIG. 5 is a graph illustrating the LO phase noise contribution vs. frequency using no pilot tracking and pilot tracking according to the embodiment of FIGS. 3 and 4.

Referring next to FIG. 5, a graph is shown illustrating the LO phase noise contribution vs. frequency offset in Hz using no pilot tracking and pilot tracking according to the embodiment of FIGS. 3 and 4. Line 502 represents the LO phase contribution spectrum without pilot tracking techniques synthesized at 4 GHz. Note that the graph of FIG. 5 does not include channel additive Gaussian noise. For example, it is estimated that in an embodiment where the radio portion is highly integrated, the achievable phase noise performance in a free running on-chip VCO may be approximately −78 dBc/Hz at 10 kHz offset. Thus, with the IEEE 802.11a waveform, the integrated phase noise interfering with each subcarrier is on the order of 2.7 degrees rms, which is excessive for 64-QAM and above. In general, in one embodiment, the achievable phase noise performance in a free running on-chip VCO is greater than about −80 dBc/Hz at 10 kHz offset. Also, in one embodiment, it is noted that phase noise is present in both the transmitter and receiver ends and that above about 1.5 degrees rms, the integrated phase noise interfering with each subcarrier at the receiver end becomes excessive for 64-QAM communications.

Line 504 represents the phase noise contribution spectrum of the LO of the radio portion with the pilot phase tracking of the embodiments described above, such that the phase noise contribution is significantly reduced, particular at lower frequency offsets. Thus, it is estimated that the integrated phase error interfering with each subcarrier can be substantially improved, the actual amount being a function of the signal constellation type and the prevailing channel SNR.

Figure 6:
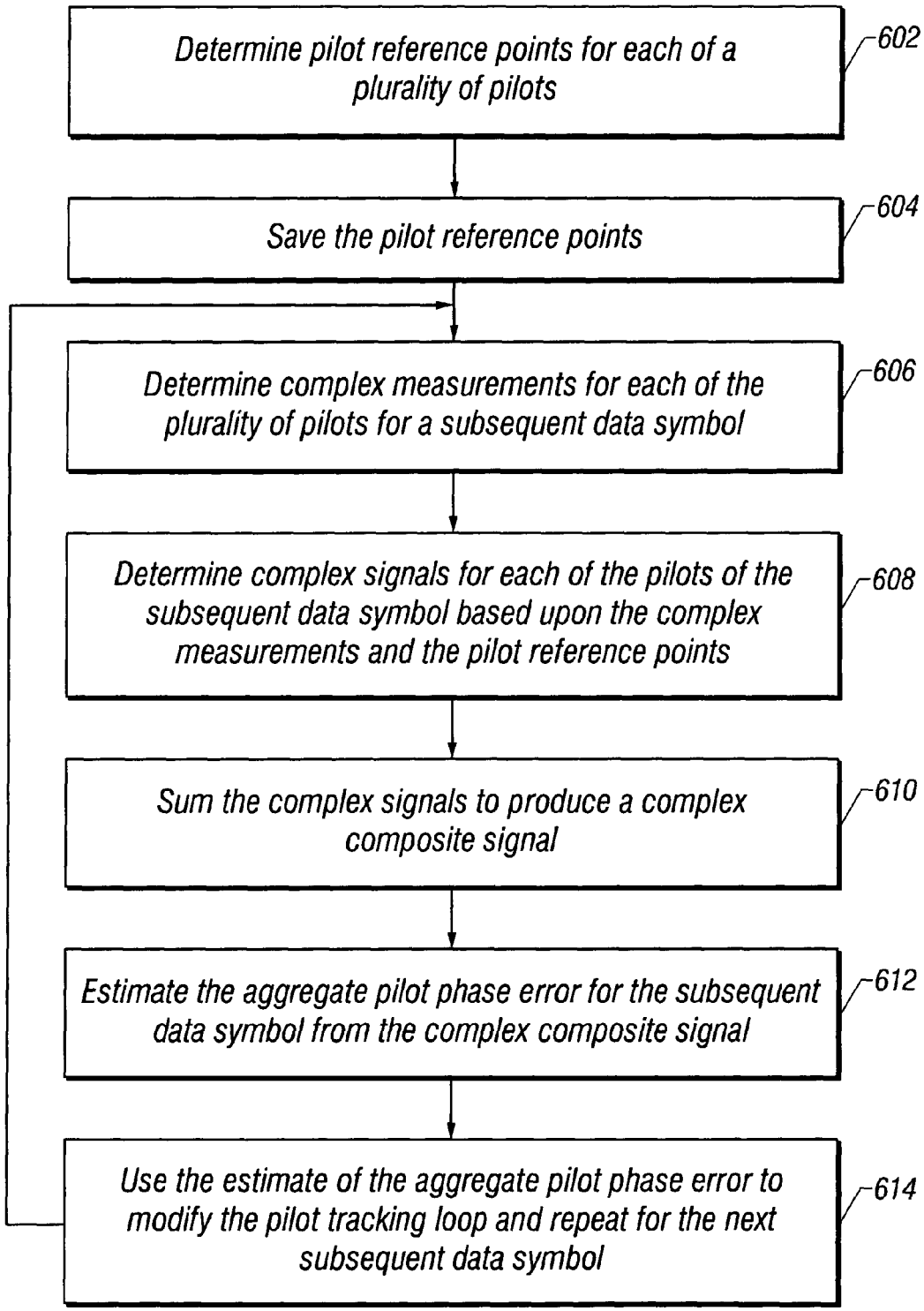
FIG. 6 is a flowchart of the steps performed in the pilot phase error metric of FIG. 4 in accordance with one embodiment of the invention.

Referring next to FIG. 6, a flowchart is shown for the steps performed by the pilot phase error metric in accordance with one embodiment of the invention. Initially, the pilot reference points are determined for each pilot subcarrier of the OFDM waveform (Step 602). These reference points $u_k$ and $v_k$ are the complex reference points within IQ space which represent the respective pilots and are determined, in one embodiment, by taking the output of the FFT operation for each of the pilots of the long symbol portion of the preamble of the IEEE 802.11a waveform. Thus, these pilot reference points are received into the pilot phase error metric 310 of FIG. 3. This is performed when the pilot tracking loop of FIG. 3 is not activated, for example, the switch 306 of FIG. 3 is in position A. Next, these reference points are saved (Step 604), for example, in the reference point storage of FIGS. 3 and 4.

In another embodiment, the pilot reference points may be obtained by taking the output of the FFT operation for each of the pilots of a particular data symbol (e.g., data portion 204 of FIG. 2) within the data symbol portion of the MAC frame (e.g., data portion 204 of FIG. 2), rather than from the long symbol portion of the preamble. In some embodiments, the length of the data portion may be signifcantly longer in duration than that specified in the IEEE 802.11a standard and may require new pilot reference points to be obtained from within the data portion. For example, in such cases, the phase of the data symbols in the middle or near the end of the data portion may be quite different relative to the pilot reference points measured during the preamble. Thus, it may be desired to obtain new pilot reference points from locations within the data portion of a MAC frame to compare with the pilots for subsequent data symbols. Thus, the pilot reference points may be obtained using pilots of symbols from the preamble or from pilot from symbols in the data portion of a MAC frame.

Next, as the subsequent data symbols of the OFDM MAC frame enter the baseband processing portion of the OFDM receiver, the pilot tracking loop is activated (e.g., switch 306 of FIG. 3 is now in position B). As such, complex signal measurements are determined in the FFT operation for each of the plurality of pilots for a subsequent data symbol, or more generically, a subsequent symbol (Step 606). In one embodiment, these complex signal measurements are received at the pilot phase error metric of FIG. 3. This is done by taking the outputs of the frequency bins of the FFT operation corresponding to the respective pilot subcarriers.

Next, the pilot phase error metric performs pre-detection combining and computes a complex signal for each pilot of the subsequent data symbol based upon the pilot reference points and the complex signal measurements for the pilots of the subsequent data symbol (Step 608). For example, the complex signal for each pilot of the subsequent data symbol is given by Eq. (11). Next, the complex signals are summed to produce a complex composite signal (Step 610). For example, the complex composite signal for the subsequent data symbol is represented in Eq. (12). It is noted that the pilot phase error metric deals strictly with vectors and thus, no phase is actually determined at this point, i.e., signal detection has not yet occurred.

Next, the aggregate pilot phase error for the subsequent data symbol is estimated (Step 612). This estimate is obtained by determining the argument of the complex composite signal, for example, as given in Eq. (13). The argument of the complex composite signal is determined as guided by Eq. (6) in the phase error estimator 410 of FIG. 4 and may be done using a cordic-based arctangent approach (see Eq. (14)) or a small angle approximation approach (see Eqs. (15) and (16)). Note that signal detection occurs during Step 612, for example, in the arctangent operation. Thus, Steps 602 through 612 apply a pilot phase error metric based on a maximum likelihood-based estimation that advantageously tracks all of the pilots for each data symbol of the OFDM waveform.

It is noted that this estimate must be modified to remove the pseudo random modulation present on the pilots. For example, this is removed at the random pilot modulation removal 412 of FIG. 4, which uses the PN pilot modulation generator 312.

Next, the estimate of the aggregate phase error is used to modify the pilot tracking loop and then Steps 606 through 614 are repeated until the end of the MAC frame (Step 614). This is done by the updating the loop filter 314 of FIG. 3, which adjusts the NCO 316 of FIG. 3. The NCO 316 causes the phase rotator 302 of FIG. 3 to de-rotate the incoming baseband signal 116 to minimize the phase error of the next symbols, e.g., the next data symbols. Then Steps 606 through 614 are repeated for the next OFDM data symbol (or more generally, the next OFDM symbol) in an iterative fashion.

In one embodiment, Steps 602, 606, 608 and 610 are performed by the maximum likelihood phase error/weighting processor 406 of FIG. 4. Step 612 is performed by the phase error estimator 410 of FIG. 4. Conveniently, all of the calculations of the maximum likelihood phase error/weighting processor 406 are carried out in rectangular form to simplify the implementation.

The steps of FIG. 6 are typically performed as a set of instructions that are performed in dedicated hardware for optimum speed in the calculations or in software using a processor or other machine to execute the instructions to accomplish the given steps. Ideally, the steps of FIG. 6 are performed by the pilot tracking loop of the baseband processing portion of an OFDM receiver having a pilot phase error metric and utilizing the FFT operation of the OFDM receiver. Additionally, the baseband processing portion and the radio portion of the OFDM receiver may be integrated on to one or more devices or chips.

Next, generally referring to the pilot tracking loop 300 of FIG. 3, in operation and according to one embodiment, the FFT 304 must wait to receive all of the samples of a given data symbol before it begins processing them. Then, the FFT 304 processes the samples in order to produce the complex signal measurements that are input to the pilot phase error metric 310. Then, the pilot phase error metric 310 processes these complex signal measurements as described with reference to FIGS. 4-6. Once an estimate of the aggregate phase error is obtained, the loop filter 314 is updated which causes the NCO 316 to make adjustments to the phase rotator 302 to minimize the phase error for subsequent data symbols. Thus, in addition to having to wait the entire 3.2 μsec length of each subsequent data symbol before the FFT 304 may begin processing, it is estimated that the total processing delay in the FFT 304 and the pilot phase error metric 310 is about another 3 μsec. This overall delay of about 6 μsec negatively impacts the maximum allowable closed-loop bandwidth of the pilot tracking loop 300.

Due to this delay, the optimum transient response performance (i.e., dead-beat response in only two samples) according to one embodiment of the pilot tracking loop of FIG. 3 occurs when $\omega_n T=1$ and damping factor $\xi=0.75$ are selected. This choice also corresponds to the maximum closed-loop bandwidth achievable in the sampled control pilot tracking loop. For example, the maximum closed-loop bandwidth is approximately 40 kHz for the 250 kHz OFDM symbol rate (of the IEEE 802.11a and HyperLAN2 standards). While this tracking loop bandwidth is sufficient to track and reduce local oscillator phase noise at small frequency offsets, it is too small to help reduce local oscillator phase noise at larger frequency offsets, for example, frequency offsets in the 100 kHz range, as is illustrated in FIG. 7 below.

Figure 7:
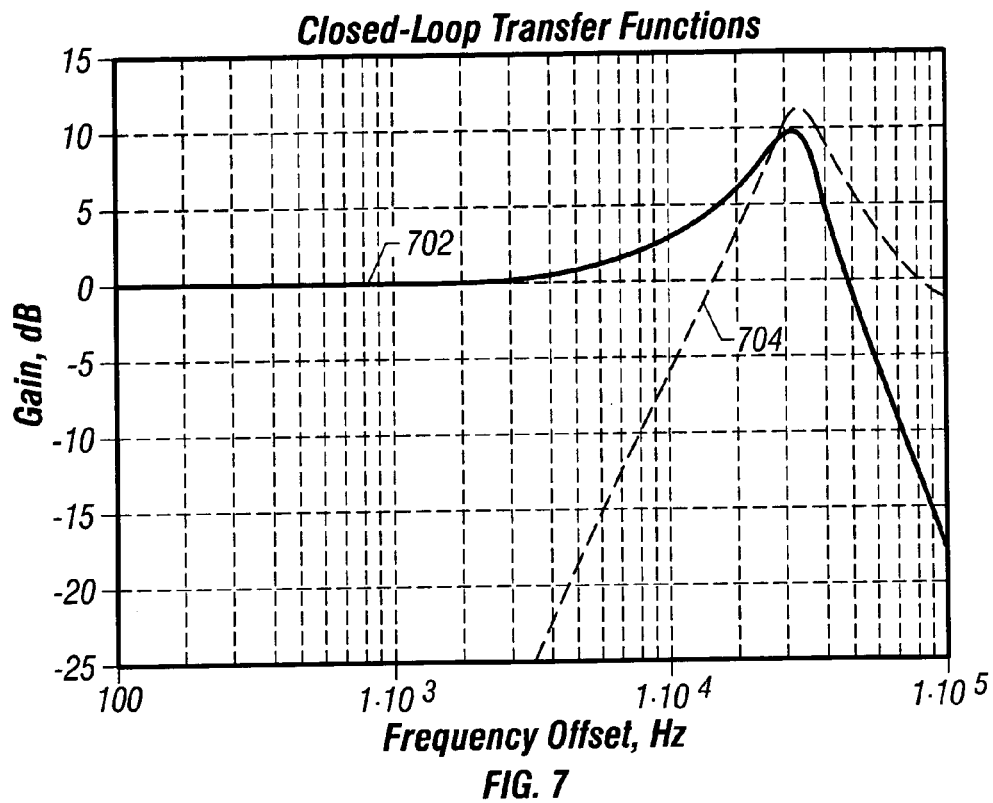
FIG. 7 is an illustration of the closed-loop transfer functions of the pilot tracking loop of FIG. 3 according to one embodiment.

Briefly referring to FIG. 7, an illustration is shown of the closed-loop transfer functions of the pilot tracking loop as shown in FIG. 3. The LO phase noise transfer function 704 and the pilot tracking loop phase noise transfer function 702 are illustrated, when the update rate is 250 kHz (i.e., 1/4.0 µsec), and when $\omega_n T=1$ (i.e., $\omega_n$ is about 13.9 kHz) and a damping factor $\xi=0.75$ are selected, which corresponds to a maximum closed loop tracking bandwidth of 40 kHz. It is noted that this illustration does not include additive Gaussian noise. As can be seen, at frequency offsets of about 40 kHz, since the gain margin for this optimum transient response is only about 2.5 dB, noise peaking rather than suppression happens near the edge of the tracking loop bandwidth. This noise peaking is on the order of about 10 dB, which actually worsens the phase noise performance and increases the likelihood of symbol errors at larger frequency offsets. In general, smaller closed loop bandwidths must be used for this reason.

Figure 8:
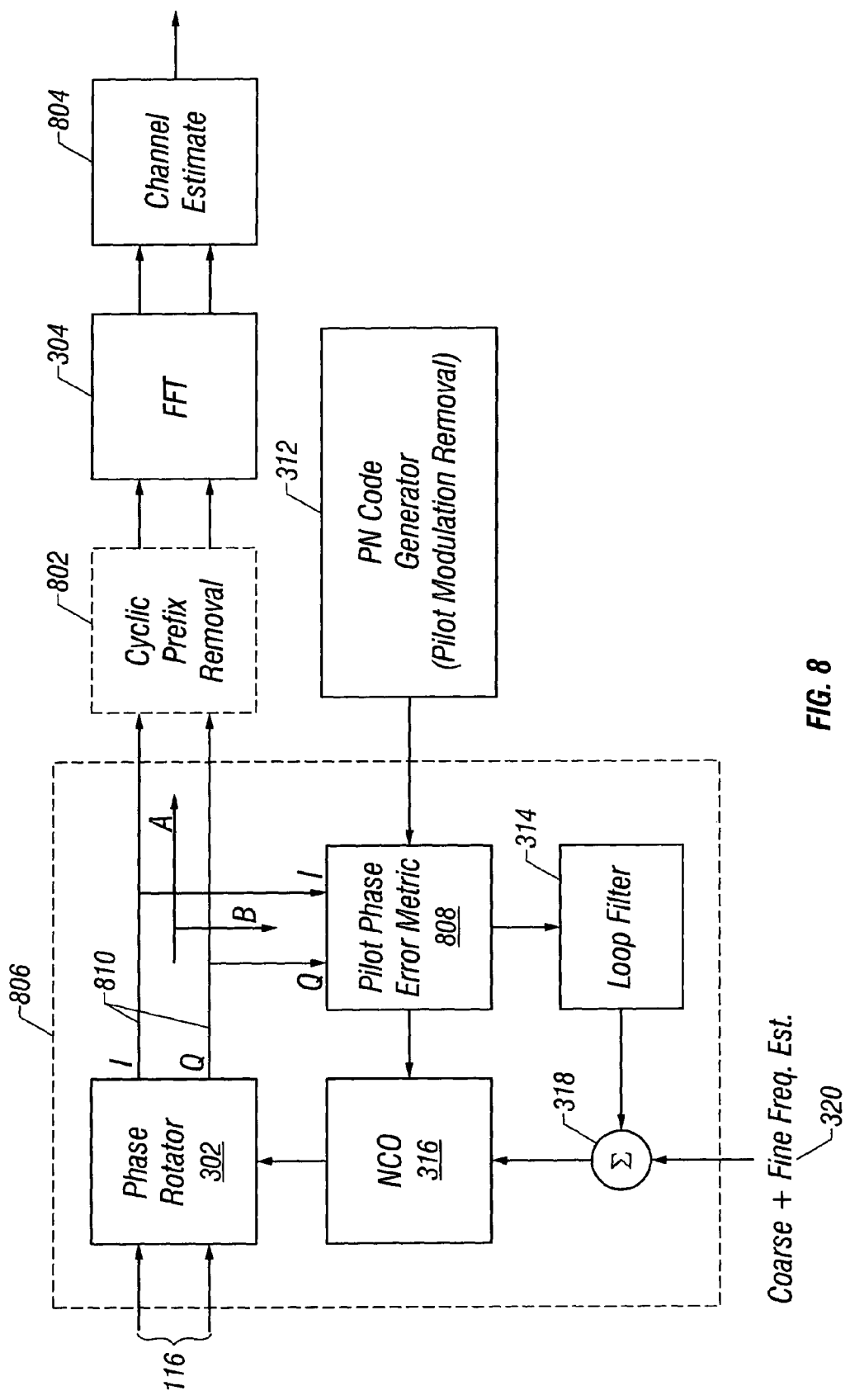
FIG. 8 is a functional block diagram of a pilot tracking loop of the baseband processing portion of the OFDM receiver of FIG. 1, which includes a phase error metric utilizing a maximum likelihood estimator for the phase error of OFDM data symbols in accordance with another embodiment of the invention.

Referring next to FIG. 8, a functional block diagram is shown of a pilot tracking loop of the baseband processing portion of the OFDM receiver of FIG. 1, which includes a pilot phase error metric utilizing a maximum likelihood estimator for the phase error of OFDM data symbols in accordance with another embodiment of the invention. Shown are the incoming signal 116, the phase rotator 302, a baseband signal 810 which is ouput from the phase rotator 302, a cyclic prefix removal 802, the FFT 304, and a channel estimator 804. Also shown is a pilot tracking loop 806, which includes the phase rotator 302, a pilot phase error metric 808 (also referred to as the phase error metric), the loop filter 314, the summation 318, the coarse and fine frequency estimate signal 320 and the NCO 316. Also shown is the PN pilot modulation generator 312.

The incoming signal 116 is input to the phase rotator 302. As described above, the incoming signal 116 may be a baseband signal or an IF signal. The output of the phase rotator 302, i.e., the baseband signal 810 or baseband I/Q signal, is coupled to both the cyclic prefix removal 802 and the pilot phase error metric 808. The output of the cyclic prefix removal 802 is coupled to the FFT 304, which is coupled to the channel estimator 804. It is noted that in some embodiments, the cyclic prefix removal 802 occurs before the phase rotator 302, such that the output of the phase rotator 302 is coupled directly to the FFT 304. Thus, the cyclic prefix removal 802 is an optional functional component illustrated in dashed lines. Furthermore, in some embodiments and as is known in the art, there may be other functional modules or processing operations that occur in between the phase rotator 302 and the FFT 304 in place of or in addition to the cyclic prefix removal 802. Within the pilot phase tracking loop 806, the output of the pilot phase error metric 808 is coupled to the loop filter 314, which is coupled to the NCO 316, which is coupled back to the phase rotator 302. Since the pilot phase error metric 310 and the loop filter 314 track relatively small frequencies, the output of the loop filter 314 is summed at summation 318 with the coarse and fine frequency estimate signal 320. The coarse and fine frequency estimate signal 320 is commonly derived at the channel estimator 804. The pilot phase error metric 808 is also coupled to the NCO 316 in order to preset the NCO 316. The PN pilot modulation generator 312 is coupled to the pilot phase error metric 808.

Advantageously in this embodiment, rather than using the FFT 304 to process and produce the complex signal measurements needed for the pilot phase error metric, the pilot phase error metric 808 generates the complex signal measurements itself. This reduces the processing delay that occurs while waiting for the FFT operation to be completed, which will increase the allowable closed-loop bandwidth.

Although the improved pilot tracking loop 806 does not utilize the FFT 304, the FFT 304 is still part of the OFDM baseband processing portion of the OFDM receiver. As shown, the incoming signal 116 passes through the phase rotator 302. In this embodiment, the output of the phase rotator 302 goes through the cyclic prefix removal 802 prior to entering the FFT 304. The cyclic prefix removal 802 removes the guard time interval prepended to each OFDM symbol. However, it is noted that the output of the phase rotator 302 may be directly routed to the FFT 304, the cyclic prefix removal occurring elsewhere. It is also understood that other functional modules or processing steps may be located in between the phase rotator 302 and the FFT 304, in place of or in addition to the cyclic prefix removal 802. The FFT 304 continues to process the baseband IQ signal. For example, according to IEEE 802.11a and HiperLAN2, the channel estimator 804 utilizes the outputs of the FFT 304 to determine the initial course frequency estimate from short symbols (e.g., $t_1$ through $t_2$) of the OFDM preamble and the fine frequency estimate from the long symbols (e.g., $T_1$ and $T_2$) of the OFDM preamble. This information is used to generate the coarse and fine frequency estimate signal 320 needed in the pilot tracking loop 806.

Instead of relying on the FFT 304 to generate the complex signal measurements needed for the pilot phase error metric 808, the output of the phase rotator, i.e., the baseband signal 810, is routed to both the FFT 304 (e.g., through the cyclic prefix removal 802) and the pilot phase error metric 808 of the pilot tracking loop 806 in parallel paths, i.e., path A and path B. This embodiment of the pilot tracking loop 806 is a departure from those known in the art. The fact that the incoming signal 116 is phase de-rotated prior to the FFT operation is unique. Most pilot tracking techniques take place and adjust the phase after the FFT operation. Furthermore, processing the baseband signal 810 in parallel paths, shown as path A and path B, with the FFT 304 is unique. Again, in known OFDM receivers, pilot tracking, if present occurs after the completion of the FFT operation, not in a parallel path to the FFT operation. Thus, the presence of path B for pilot tracking is not known in the existing art.

Advantageously, according to this embodiment, all pilot tracking occurs before the FFT 304 operation, such that the phase error for subsequent symbols, e.g., subsequent data symbols, is reduced prior to these subsequent OFDM data symbols being processed by the FFT 304. Thus, the output of the phase rotator 302 is routed to the pilot phase error metric 808, which outputs an estimate of the aggregate phase error over the entire OFDM data symbol. This estimate is used to update the loop filter 314, which triggers the NCO 316 to rotate the phase of the incoming signal 116 for subsequent OFDM symbols.

The pilot phase error metric 808 is similar to the pilot phase error metric 310 of FIG. 3, but includes respective discrete Fourier transforms (DFTs) to generate complex signal measurements corresponding to each of the respective pilot subcarriers of the OFDM symbols. See FIG. 9 for more details on the pilot phase error metric 808. Thus, the pilot phase error metric 808 of FIG. 8 determines its own pilot reference points ($u_k$ and $v_k$) and saves them. Then the pilot phase error metric 808 determines complex signal measurements ($I_{k,m}$ and $Q_{k,m}$) corresponding to each of the pilot subcarriers of subsequent symbols and processes them as the pilot phase error metric 310 of FIG. 3.

However, since the pilot phase error metric 808 does not have to wait for the FFT 304 operation to be complete, the pilot phase error metric 808 may generate an aggregate phase error almost immediately after receiving the last time sample of the baseband signal 810 for a given symbol. This reduces the time delay within the pilot tracking loop, which will increase the allowable closed-loop bandwidth. In contrast, the FFT 304 of FIGS. 3 and 8 waits until it receives all of the samples of the given OFDM symbol, e.g., given OFDM data symbol, to begin processing them.

Figure 9:
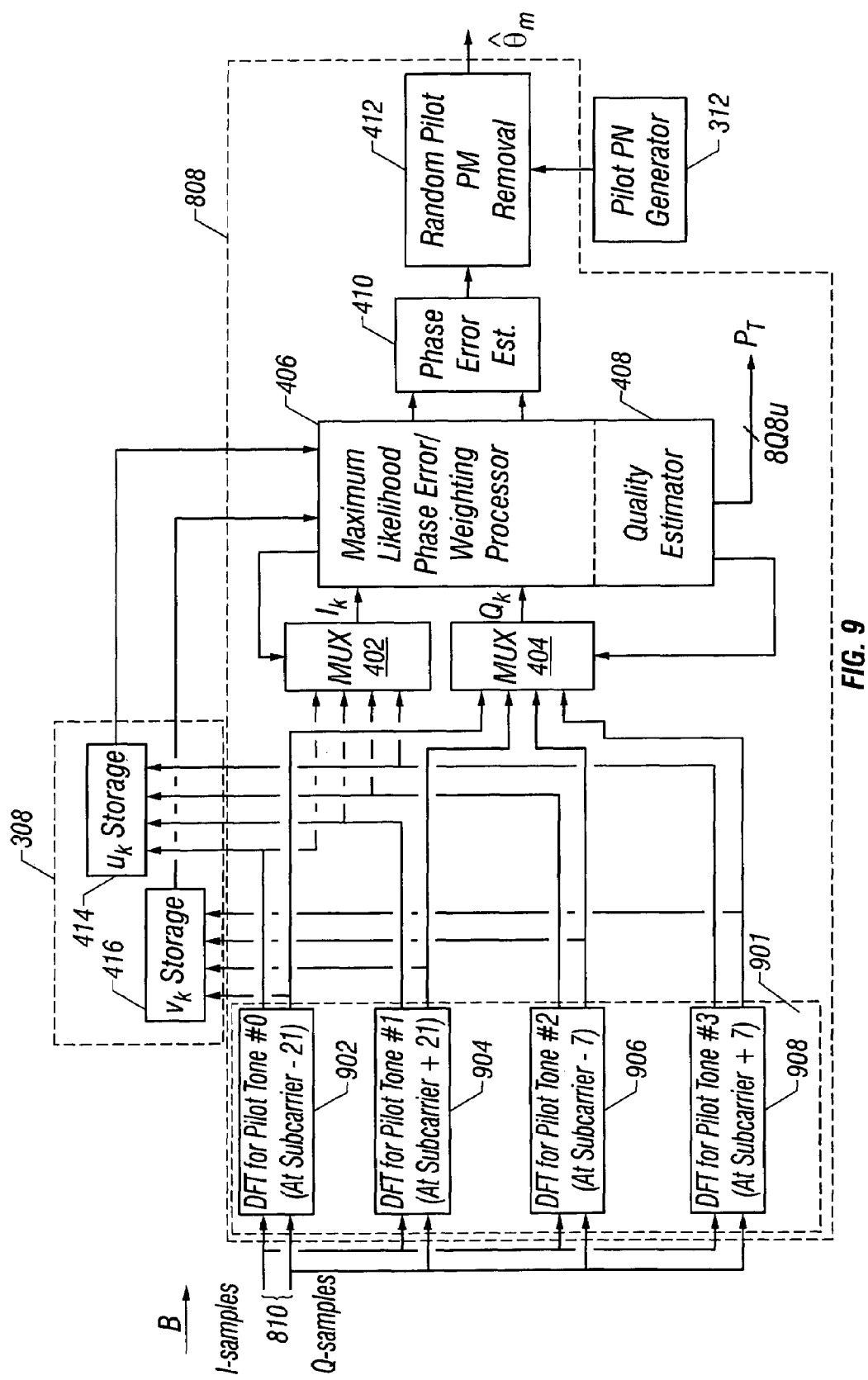
FIG. 9 is a functional block diagram of the pilot phase error metric of the pilot tracking loop of FIG. 8 using an optimum maximum likelihood estimation performed in accordance with one embodiment of the invention.

Referring next to FIG. 9, a functional block diagram is shown of the pilot phase error metric of the pilot tracking loop of FIG. 8 using a maximum likelihood estimation performed in accordance with one embodiment of the invention. Shown is the pilot phase error metric 808 including a discrete Fourier transform portion 901 (hereinafter referred to as DFT portion 901), multiplexers 402 and 404, a maximum likelihood phase error/weighting processor 406, a quality estimator 408, a phase error estimator 410, and a random pilot modulation removal 412. The DFT portion 901 includes DFTs 902, 904, 906 and 908 (each of which may be referred to generically as Fourier transforms). Also shown are the PN pilot modulation generator 312 and the reference point storage 308, which includes a $u_k$ storage 414 and a $v_k$ storage 416.

In operation, the pilot phase error metric 808 of FIG. 9 works similarly to the pilot phase error metric 310 of FIG. 4. However, rather than relying on the FFT to determine the respective pilot reference points $u_k$ and $v_k$ and to determine the complex signal measurements for the $m^{th}$ subsequent data symbol $I_{k,m}$ and $Q_{k,m}$, these values are determined in the DFT portion 901 by respective ones of DFTs 902, 904, 906 and 908. Each of these DFTs is configured to process the respective pilots of the OFDM waveform. For example, according to one embodiment, during the long symbol portion of the OFDM of the preamble, DFT 902 determines the complex signal measurements in rectangular form for pilot #0 (i.e., DFT 902 determines $u_0$ and $v_0$), DFT 904 determines the complex signal measurements in rectangular form for pilot #1 (i.e., DFT 904 determines $u_1$ and $v_1$), DFT 906 determines the complex signal measurements in rectangular form for pilot #2 (i.e., DFT 906 determines $u_2$ and $v_2$), and DFT 908 determines the complex signal measurements in rectangular form for pilot #3 (i.e., DFT 908 determines $u_3$ and $v_3$). These values of $u_k$ and $v_k$ are stored in the reference point storage 308, i.e., in the $u_k$ storage 414 and a $v_k$ storage 416. It is noted that the reference point storage 308 is not shown in FIG. 8. This reference point storage 308 may be embodied within the pilot phase error metric 808 or separately, as shown, such that the reference point storage 308 couples to the pilot phase error metric 808. With respect to Step 602 of FIG. 6, respective ones of DFTs 902, 904, 906 and 908, not the FFT operation of the OFDM receiver, determine the pilot reference points for each of a plurality of k pilots. As described with reference to FIG. 4, these pilot reference points are saved for use in the maximum likelihood phase error/weighting processor 406.

Next, as the subsequent data symbols of the OFDM MAC frame are received, the pilot tracking loop 806 is activated. As such, complex signal measurements are determined by the DFT portion 901 using respective ones of DFTs 902, 904, 906 and 908 for each of the plurality of pilots for the subsequent symbols, e.g., subsequent data symbols, rather than using the FFT operation. Thus the DFTs 902, 904, 906 and 908 determine the complex signal measurements ($I_{k,m}$ and $Q_{k,m}$) corresponding to each of the pilot subcarriers of subsequent symbols. Once these values of $I_{k,m}$ and $Q_{k,m}$ are determined, they are coupled to multiplexers 402 and 404 and processed by the maximum likelihood phase error/weighting processor 406, the phase error estimator 410 and the random pilot modulation removal 412 as described with reference to FIGS. 4 and 6 in order to produce an estimate of the aggregate phase error of the processed data symbol, $\hat{\theta}_m$. Thus, the phase error metric 808 also follows the same steps as recited in FIG. 6; however, Steps 602 and 606 are performed by the DFT portion 901, instead of FFT 304.

It is noted that in some embodiments, the data portion of the MAC frame may be much longer in duration than that specified in IEEE 802.11a. In such cases, it may be necessary to obtain and store updated pilot reference points at one or more locations within the data portion in addition to or in place of pilot reference points obtained from the preamble portion of the MAC frame. For example, at a specified symbol (e.g., data symbol) within the data portion, the complex measurements obtained for the pilots of a particular OFDM data symbol are stored as pilot reference points, replacing the pilot reference points previously obtained during the preamble portion of the OFDM waveform. Thus, in Step 602 of FIG. 6, the pilot reference points may be obtained from the pilots of an OFDM symbol, e.g., an OFDM data symbol, within the data portion of the MAC frame. Next, the complex signal measurements of the pilots of subsequent OFDM symbols, e.g., subsequent OFDM data symbols, are compared to the pilot reference points obtained from thin the data portion of the MAC frame.

In this embodiment, since the pilot phase error metric 808 does not have to wait for the FFT 304 operation to be complete, the pilot phase error metric 808 generates an aggregate phase error almost immediately after receiving the last time sample of the baseband IQ signal output from the phase rotator 302 for a given symbol. This reduces the time delay within the pilot tracking loop, which will increase the allowable closed-loop bandwidth. In contrast, the FFT 304 of FIGS. 3 and 8 waits until it receives all of the samples of the given OFDM data symbol to begin processing them. According to one embodiment, the time delay from the arrival of the last input sample pair (I,Q) of the current OFDM symbol into the pilot phase error metric 808 to the computation of the output of the phase error metric 808, $\hat{\theta}_m$, should be less than or equal to 10 clocks at 40 MHz. Ideally, the total transport delay through the pilot phase error metric 808 should be kept to less than 10% of an OFDM symbol, i.e., about 0.40 μsec. Advantageously, this represents a significant savings in time as compared to using the output bins of the FFT as described with reference to FIGS. 3-5.

It is noted that in some embodiments, the pilot phase error metric 808 of FIG. 8 and the pilot phase error metric 310 of FIG. 3 may employ other metrics to track the phase error of the OFDM data symbols. For example, rather than determining an aggregate phase error estimate of the current OFDM data symbol relative to the pilot reference points for each of the pilots of the preamble or for each of the pilots of a data symbol within the data portion of the MAC frame, a phase error estimate may be determined by tracking the pilots of the current OFDM data symbol relative to the strongest pilot of the preamble. Even such pilot phase error metrics when applied in the pilot tracking loops of FIGS. 3 and 8 are a departure from the known art since the phase rotation is applied to the incoming signal for subsequent OFDM data symbols prior to being input into the FFT operation of the OFDM receiver.

Figure 10:
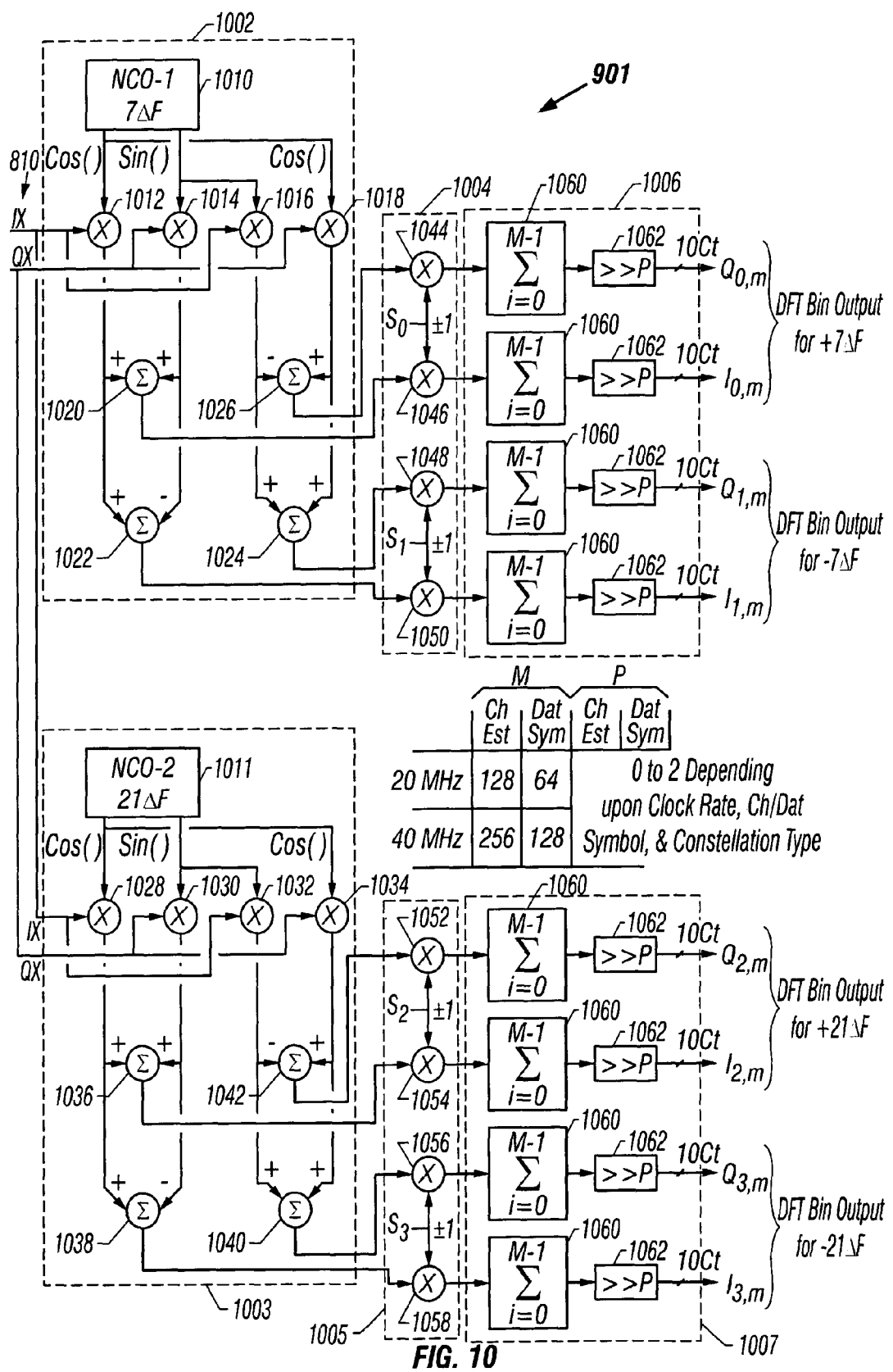
FIG. 10 is a functional block diagram of a discrete Fourier transform portion of the pilot phase error metric of FIG. 9 in accordance with yet another embodiment of the invention.

Referring next to FIG. 10, a functional block diagram is shown of one embodiment of the DFT portion 901 of the phase error metric of FIG. 9. Illustrated is the DFT portion 1001 including the baseband signal 810 input into correlation processors 1002 and 1003, sign reversal modules 1004 and 1005, and integrate and dump modules 1006 and 1007.

In correlation processor 1002, the inphase (I) and quadrature (Q) terms of the baseband signal 810 are correlated with the respective ones of the sine and cosine of the output of a numerically controlled oscillator 1010 at 7 ΔF (hereinafter referred to as NCO 1010) at multipliers 1012, 1014, 1016, and 1018. The outputs of multipliers 1012 and 1014 are summed at summation 1020, while the output of multiplier 1014 is subtracted from the output of multiplier 1012 at summation 1022. The outputs of multipliers 1016 and 1018 are summed at summation 1024, while the output of multiplier 1016 is subtracted from the output of multiplier 1018 at summation 1026.

Similarly, in correlation processor 1003, the inphase (I) and quadrature (Q) terms of the baseband signal 810 are correlated with the respective ones of the sine and cosine of the output of a numerically controlled oscillator 1011 at 21 ΔF (hereinafter referred to as NCO 1011) at multipliers 1028, 1030, 1032, and 1034. The outputs of multipliers 1028 and 1030 are summed at summation 1036, while the output of multiplier 1030 is subtracted from the output of multiplier 1028 at summation 1038. The outputs of multipliers 1032 and 1034 are summed at summation 1040, while the output of multiplier 1032 is subtracted from the output of multiplier 1034 at summation 1042.

As is easily seen, due to symmetries in the pilot tone frequencies, the number of discrete DFTs is reduced from 4 to 2. That is, the number of NCOs and complex cross multiplies is reduced from 4 to 2 in the correlation processors 1002 and 1003. Since the pilots are located at ±7 and ±21 times the basic subcarrier spacing ΔF (e.g., 312.5 kHz), the NCOs 1010 and 1011 operate at 7 ΔF and 21 ΔF respectively and the negative frequencies are realized by using different signs in the addition processes (e.g., respective ones of summations 1020, 1022, 1024, 1026, 1036, 1038, 1040 and 1042) that immediately follow the multiplications (e.g., at respective ones of multipliers 1012, 1014, 1016, 1018, 1028, 1030, 1032 and 1034). Since these two frequencies (i.e., 7 ΔF and 21 ΔF) are known a priori, and they are tied to the symbol timing, the outputs of NCOs 1010 and 1011 are straight forward known number sequences.

Next, polarity differences between the pilot tones due to the random bi-phase modulation (e.g., BPSK) that is imposed on the OFDM pilot subcarriers are removed using respective ones of sign reversal multipliers 1044, 1046, 1048, 1050, 1052, 1054, 1056 and 1058 of the sign reversal modules 1004 and 1005. This is due to the fact that depending on various modes, the polarity of all the pilot tones is not necessarily +1. For example, the polarity of one or more pilot tones may be set to +1 while the polarity of others of the pilot tones may be set to −1. Since these polarities are known a priori, they are corrected at the sign reversal modules 1004 and 1005. This ensures that the removal of the random bi-phase modulation of the pilot subcarriers for the subsequent data symbols can be easily done at the conclusion of the pilot phase error metric 808, e.g., by the random pilot modulation removal 312 of FIG. 8.

As such, the output of summations 1026 and 1020 are multiplied at sign reversal multipliers 1044 and 1046, respectively, by $S_0$; the output of summations 1024 and 1022 are multiplied at sign reversal multipliers 1048 and 1050, respectively, by $S_1$; the output of summations 1042 and 1036 are multiplied at sign reversal multipliers 1052 and 1054, respectively, by $S_2$; and the output of summations 1040 and 1038 are multiplied at sign reversal multipliers 1056 and 1058, respectively, by $S_3$. The values of $S_0$-$S_3$ are either ±1 depending on the specific system design. It is noted that if all of the pilot tones have the same polarity, e.g., +1, the sign reversal modules 1004 and 1005 are not needed. It is noted that the sign reversal modules 1004 and 1005 could occur either before the correlation processors 1002 and 1003, or after the respective integrate and dump modules 1006 and 1007; however, the location was chosen in order to minimize the number of gates for implementation.

Next, the outputs of sign reversal modules 1004 and 1005 (or respective summations of the correlation processors 1002 and 1003, if no sign reversing is required), are input to integrate and dump modules 1006 and 1007. Each signal is input to a respective one integrators 1060, which is then input to a respective one of shifters 1062. The number of samples summed in the integrators 1060 depends on whether the long symbols $T_1$ and $T_2$ of the long symbol portion 208 are being summed in the channel estimation (accumulating 2×3.2 μsec or 128 samples at 20 MHz (or 256 samples at 40 MHz)), i.e., Ch Est in FIG. 10, in order to determine the pilot reference points $u_k$ and $v_k$, or whether the subsequent pilot symbols are being received to determine the $I_{k,m}$ and $Q_{k,m}$ values (accumulating 3.2 μsec or 64 samples at 20 MHz (or 128 samples at 40 MHz)), i.e., Dat Sym in FIG. 10. Thus, the number of samples summed in the integrators 1060 depends on whether the DFT portion 901 is determining the pilot reference points (Step 602 of FIG. 6) or whether the DFT portion 901 is determining the complex signal measurements for each of the pilots of a subsequent data symbol (Step 606 of FIG. 6). Additionally, the shifters 1062 dump a number of bits from 0 to 2 depending on the clock rate, the type of symbol (e.g., channel estimation symbol (Ch Est) or data symbol (Dat Sym)), and the type of constellation type or modulation.

As is know, the integrate and dump modules 1006 and 1007 should be synchronized with the period of time recognized by the receiver as the active portion of the received OFDM symbol, and accumulation only occurs over this interval, e.g., a 3.2 μsec window. The accumulation window should be similarly aligned in time with the channel estimation process, precisely in-synch with the FFT channel estimation process that is occurring in parallel at the channel estimator 804 of FIG. 8.

Thus, the DFT portion 901 outputs either the pilot reference points $u_k$ and $v_k$ or the complex signal measurements for the $m^{th}$ subsequent data symbol $I_{k,m}$ and $Q_{k,m}$. Thus, there is a respective DFT bin output for each of the plurality of pilots of the OFDM waveform. For example, as illustrated in FIG. 10, there is a separate DFT bin output for the pilots at +7 ΔF, −7 ΔF, +21 ΔF and −21 ΔF. These outputs are coupled to either the reference point storage 308 or one of multiplexers 402 and 404 as shown in FIG. 8.

It is noted that the functionality and design of the correlation processors 1002 and 1003, the sign reversal modules 1004 and 1005 and the integrate and dump modules 1006 and 1007 components of the DFT portion 901 of the phase error metric 808 are well understood in the art. It is also noted that the DFT portion 901 represents one embodiment of the DFT portion 901 including DFTs 902, 904, 906 and 908 of FIG. 9. It is further noted that one of ordinary skill in the art could easily modify the DFT portion 901 to achieve slightly different results depending on the implementation.

Figure 11:
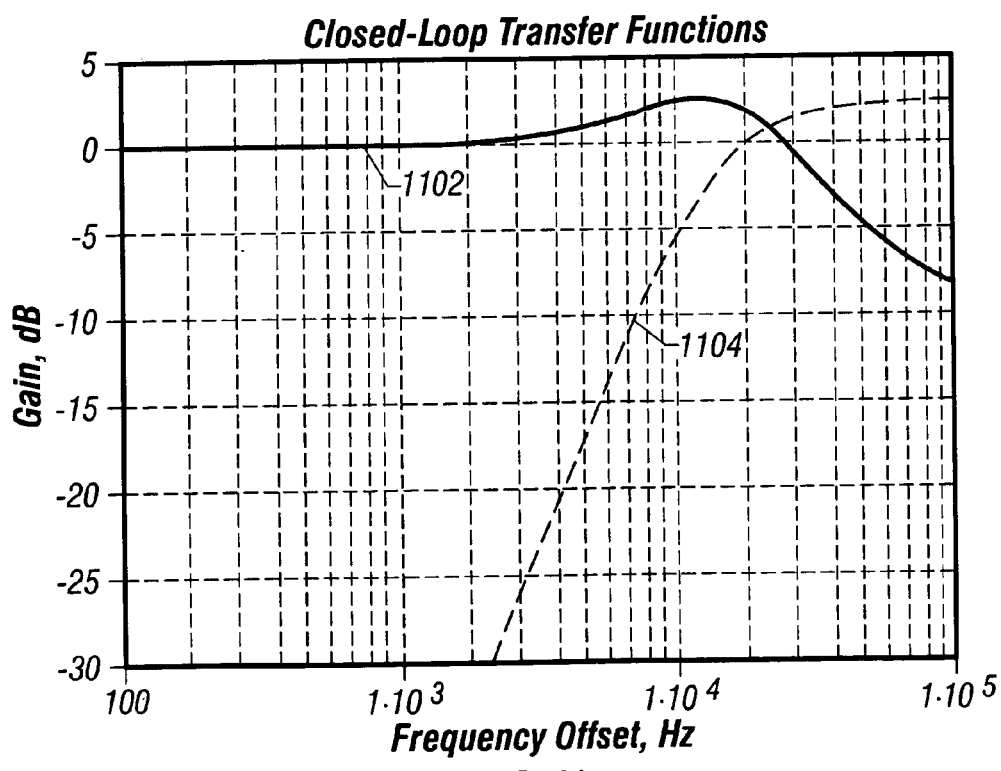
FIG. 11 is an illustration of the closed-loop transfer functions of the pilot tracking loop 806 of FIG. 8 according to another embodiment.

Referring next to FIG. 11, an illustration is shown of the closed-loop transfer functions of the pilot tracking loop 806 of FIG. 8. The LO phase noise transfer function 1104 and the pilot tracking loop phase noise transfer function 1102 are illustrated, when the update rate is 250 kHz (i.e., 1/4.0 µsec), and when $\omega_n T=1$ (i.e., $\omega_n$ is about 13.9 kHz) and a damping factor $\xi=0.75$ are selected. It is noted that this illustration does not include additive Gaussian noise. This choice also corresponds to the maximum closed-loop bandwidth achievable in the sampled control pilot tracking loop. For example, the maximum usage closed-loop bandwidth is approximately 40 kHz for the 250 kHz OFDM symbol rate (of the IEEE 802.11a and HyperLAN2 standards) without the additional delay, in comparison to the maximum usable closed loop bandwidth of 15 kHz with the additional delay as shown in FIG. 7. Note that the maximum closed-loop bandwidth is derived from the symbol rate of 250 kHz divided by $2\pi$ given an acceptable amount of delay. As can be seen, and in comparison to the illustration of FIG. 7, at frequency offsets of about 15 kHz, the noise peaking as shown in FIG. 7 is substantially reduced. Thus, due to the increased tracking loop bandwidth, the pilot tracking loop 806 of FIG. 8 is sufficient to track and reduce local oscillator phase noise at small frequency offsets, as well as at larger frequency offsets.

Figure 12:
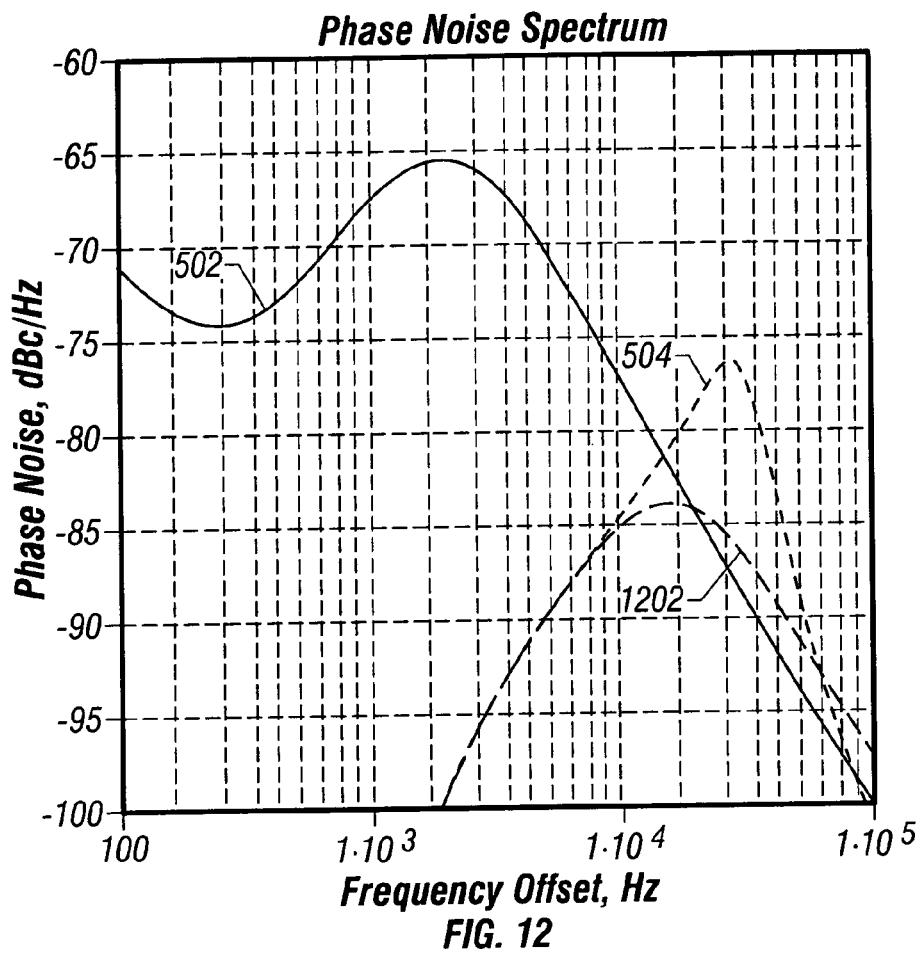
FIG. 12 is a graph illustrating the LO phase noise contribution vs. frequency using no pilot tracking, pilot tracking according to the embodiment of FIGS. 3 through 4 and pilot tracking according to the embodiments of FIGS. 8 through 10.

Referring next to FIG. 12, a graph is shown illustrating the LO phase noise contribution vs. frequency using no pilot tracking, pilot tracking according to the embodiment of FIGS. 3 through 4 and pilot tracking according to the embodiments of FIGS. 8 through 10. Line 502 represents the LO phase contribution spectrum without pilot tracking techniques synthesized at 4 GHz. Note that the graphs of FIG. 5 and FIG. 12 do not include channel additive Gaussian noise. For example, it is estimated that in one embodiment where the radio portion is highly integrated, the achievable phase noise performance in a free running on-chip VCO will be approximately −78 dBc/Hz at 10 kHz offset. Thus, with the IEEE 802.11a waveform, according to one embodiment, the integrated phase noise interfering with each subcarrier is on the order of 2.7 degrees rms, which is excessive for 64-QAM and above. Generally, according to one embodiment, the achievable phase noise performance in a free running on-chip VCO is typically greater than about −80 dBc/Hz at 10 kHz offset, which results in an integrated phase noise interfering with each subcarrier of greater than 2.5 degrees rms.

Line 504 represents the phase noise contribution spectrum of the LO of the radio portion with the pilot phase tracking of the embodiment of FIGS. 3 through 4 as described above, such that the phase noise contribution is significantly reduced, particular at lower frequency offsets. It is also seen that at higher frequency offsets, e.g., between 10 kHz and 100 kHz, the phase noise actually worsens in comparison to not using any pilot tracking techniques. It is also noted that as the closed loop tracking bandwidth is increased in the pilot tracking loop of FIGS. 3 and 4, more and more instability results due to additional delay added. Although not illustrated in FIG. 12, this results in an even more pronouced phase noise peaking at about 25-30 kHz in comparison to that shown in line 504.

Line 1202 represents the phase noise contribution spectrum of the LO of the radio portion with the optimum pilot phase tracking of the embodiment of FIGS. 8 through 10 as described above, such that the phase noise contribution is also reduced, in comparison to no pilot tracking techniques and also in comparison to the phase noise contribution of the pilot phase tracking of FIGS. 3 through 4. In particular, the peaking shown in line 504 is reduced at higher frequency offsets, more closely resembling line 502 at frequency offsets greater than about 11 kHz. Thus, as can be seen, the phase noise performance in a free running on-chip VCO will be approximately −85 dBc/Hz at a 10 kHz frequency offset. Thus, according to this embodiment, the integrated phase noise is advantageously reduced from about 2.7 degrees rms to about 0.48 degrees rms using the pilot tracking loop of FIG. 8. According to some embodiments, the integrated phase noise may be reduced from greater than about 2.5 degrees rms to less than about 1 degree rms, and more preferably, less than 0.5 degrees rms. This improvement in the phase noise makes it possible to reduce the requirements on the radio's LO phase noise performance. This improvement also makes it possible to support higher order modulations, such as MPSK and M-ary QAM, e.g., QPSK, 16-QAM, 64-QAM, 128-QAM, or higher.

Figure 13:
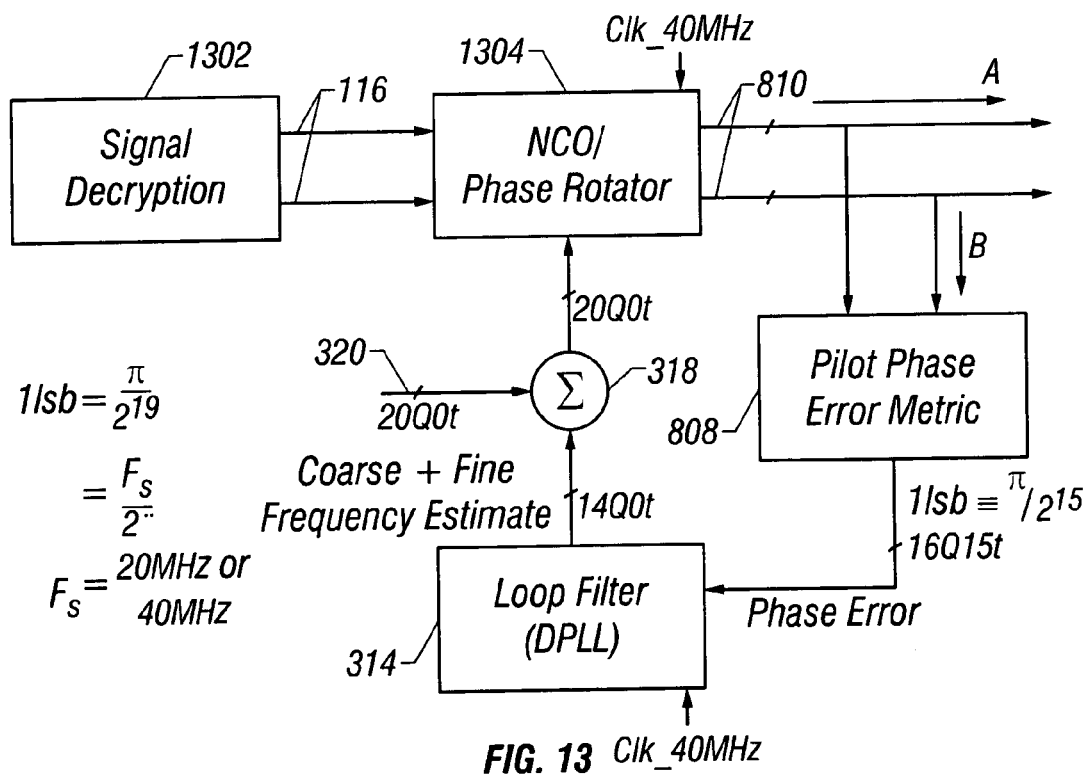
FIG. 13 is a functional block diagram illustrating the loop filter of the pilot tracking loop of FIG. 8 according to one embodiment of the invention.

Referring next to FIG. 13, a functional block diagram is shown illustrating the loop filter of the pilot tracking loop of FIG. 8 according to one embodiment of the invention. Illustrated are a signal decryption module 1302, the incoming signal 116 (which is a baseband signal in this embodiment), an NCO/phase rotator 1304 outputting baseband signal 810, the phase error metric 808, the loop filter 314, coarse/fine frequency estimate signal 320 and a summation 318. Also shown are path A and path B for the baseband signal 810.

Although the loop filter 314 is illustrated for the embodiment of FIG. 8, these details of the loop filter also apply to the embodiment of FIG. 3. It is noted that the signal decryption module 1302 is shown in FIG. 13, although not illustrated in FIG. 8. Thus, according to this embodiment, the incoming signal 116 received into the NCO/phase rotator 1304 has already been decrypted. Furthermore, in this illustration, for simplicity, the NCO and phase rotator functional blocks of FIG. 8 are combined into the NCO/phase rotator module 1304.

The loop filter 314, illustrated as a closed-loop tracking filter functions as a digital phase lock loop that tracks out small frequency errors remaining after the coarse and fine frequency estimation steps performed, for example, by the channel estimator 804 of FIG. 8. As described above, the input to the loop filter 314 is an estimate of the aggregate phase error of the processed data symbol relative to the average pilot phase of the pilot reference points, $\hat{\theta}_m$. In this embodiment, the loop filter 314 (and the NCO/phase rotator module 1304) is clocked at sampling rates of 20 MHz or 40 MHz and the loop filter 314 outputs 20-bit words (19.07 Hz/lsb at 20 MHz or 38.15 Hz/lsb at 40 MHz). Since the pilot phase error metric 808 and the loop filter track relatively small frequencies, the coarse/fine frequency estimate signal 320 (from the channel estimation process during the long symbols of the preamble) is summed with the output of the loop filter 314 at summation 318. The resulting output to the NCO/phase rotator module 1304 updates the NCO and causes the phase rotator to de-rotate the phase of the incoming baseband signal 116 in order to reduce phase error and noise over the symbols of the OFDM MAC frame.

Figure 14:
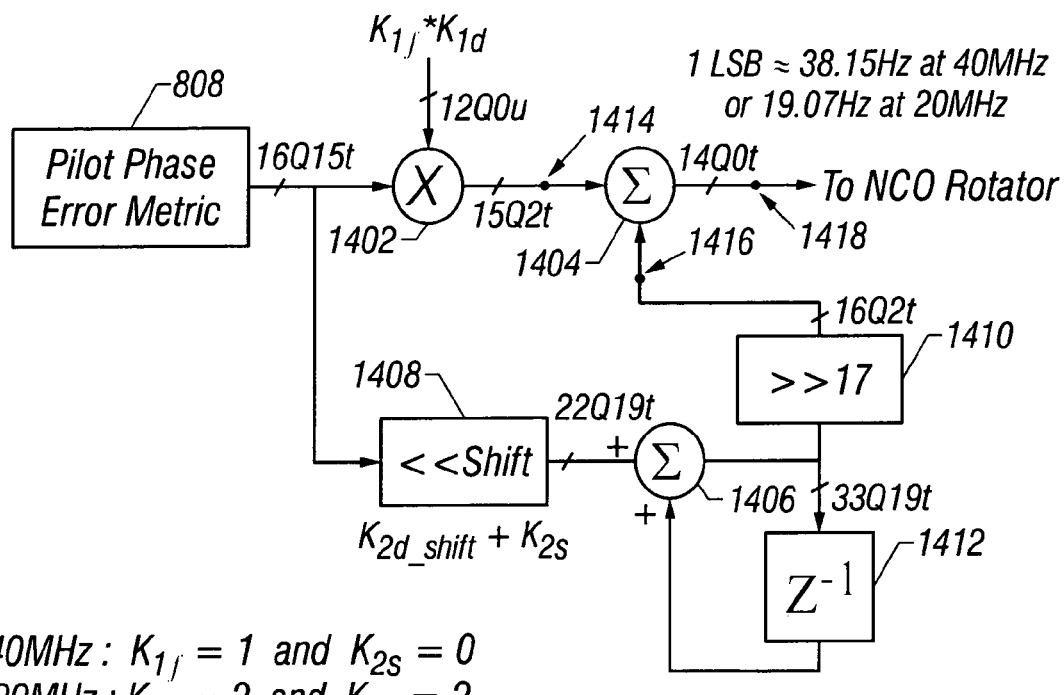
FIG. 14 is a functional block diagram of a digital implementation of the loop filter of FIG. 13 according to another embodiment of the invention.

Referring next to FIG. 14, a functional block diagram is shown of a digital implementation of the loop filter of FIG. 13 according to another embodiment of the invention. Illustrated are the pilot phase error metric 808, multiplier 1402, summations 1404 and 1406, bit shifters 1408 and 1410, and z-transform 1412. In this embodiment, the z-transform 1412 is a simple one clock delay. The output of the phase error metric 808 (or optionally, phase error metric 310) is multiplied at multiplier 1402 with digital parameters $K_{1f}*K_{1d}$, to produce a digital phase lock loop proportional term 1414, where digital parameter $K_{1f}=1$ at 40 MHz ($K_{1f}=2$ at 20 MHz) and digital parameter $K_{1d}$ is derived by setting the loop natural frequency $\omega_n$ and the damping factor $\xi$ at desired values and then computing the digital gains to achieve equivalent loop filter outputs for the digital implementation as compared to a classical analog PLL response.

In parallel to determining the proportional term 1414, the output of the phase error metric 808 is input to bit shifter 1408 (which is a left shifter), which shifts the input word by $K_{2d\_shift} + K_{2s}$, where digital parameter $K_{2s}$ is 0 at 40 MHz or 2 at 20 MHz, and digital parameter $K_{2d\_shift}$ is derived by setting the loop natural frequency $\omega_n$ and the damping factor $\xi$ at desired values and then computing the digital gains to achieve equivalent loop filter outputs for the digital implementation. The output of bit shifter 1408 is summed at summation 1406 with the output of the summation 1406 as output from z-transform 1412 (e.g., one clock delay) and fed back into summation 1406. Also, the output of summation 1406 is also input to bit shifter 1410 (which is a right shifter) in order to produce the digital phase lock loop integral term 1416. The integral term 1416 is summed with the proportional term 1414 at summation 1404 to produce the loop filter output 1418.

The fixed-point Q numbers illustrated in FIG. 14 indicate the number of binary bits and the position of their relative binary points. Any change in the Q format after an operation implies truncation of the least significant bits after the binary points (the fractional part) and dropping the most significant bits before the binary point (the integer part) while preserving the msb sign bit. For example, the Q format for the product the output of the phase error metric 808 and $K_{1f}*K_{1d}$ at multiplier 1402 is 16Q15t*12Q0u or 28Q15t and is converted to 15Q2t by truncating 13 lsbs. Another example is the summation of the proportional term 1414 (15Q2t) and the integral term 1416 (16Q2t) at summation 1404 results in 16Q2t number and is converted to 14Q0t by dropping 2 lsbs. Rounding and saturation are assumed in these conversions.

The phase detector gain $K_{dd}$ is such that the a full-scale error of 180 degrees yields a unity output, and the NCO step size $K_{vd}$ is given by $$K_{vd} = 2\pi\left(\frac{F_s}{2^{20}}\right),$$

where $F_s$ is 40 MHz or 20 MHz, for example. Under these conditions, the digital gains $K_1$ and $K_2$ are given by:

$$K_1 = \omega_n \xi \left(\frac{K_{vd}}{2\pi}\right)^{-1} \quad \text{Eq. (19)}$$

$$K_2 = \pi T_s \left(\frac{\omega_n^2}{K_{vd}}\right) \quad \text{Eq. (20)}$$

where $\omega_n$ is the natural loop frequency, $\xi$ is the damping factor, $K_{vd}$ is the NCO step size, and $T_s$ is $F_s^{-1}$.

For $\xi=0.5$, $\omega_n=2\pi 4000$ Hz, $K_v=2\cdot\pi\cdot 100\cdot 10^3$ and $K_d=1$, and approximately 69.813 Hz per 1° phase error, which corresponds to 32768/180 at the input to the loop filter, the digital proportional term 1414 output is:

$K_{1d}=329$ in 12Q0u $1°$ phase error $\equiv \dfrac{32768}{180} = 182$ in 16Q15t Proportional (1° phase error) = 182·329 = 598 in 28Q15t $\xrightarrow{\text{truncate 3 lsbs}} 7.3 \to 7$ in 15Qt $\xrightarrow{\text{truncate 2 lsbs and drop 4 msbs}} 1.75 \to 2$ in 9Q0t $\approx 2\cdot 38.15$ Hz = 76.3 Hz A subset of the possible settings for the loop filter digital parameters $K_1$ and $K_2$ for operation at a sampling rate of 40 MHz are shown in Table 1 below. Digital parameter $K_{1d}$ is the rounded $K_1$ value representing with 13-bit unsigned number (13Q0u) in the fixed-point implementation. Digital parameter $K_{2d}$ is a fixed point representation of $K_2*16$ and rounded to the closest power of 2's so that the multiplier on the integral path can be implemented with the left bit shifter 1408 as indicated in Table 1 by $K_{2d\_shift}$. At the 20 MHz rate, the $K_1$ and $K_2$ values are as given in Table 1 except that they must be multiplied by factors of 2 and 4, respectively. In this embodiment, the output 1418 of the digital implementation of the loop filter 314 has resolution of $$\frac{F_s}{2^{20}}$$

Hz per lsb.

It is noted that the loop filter 314, such as the digital implementation illustrated in FIG. 14 is operated under processor control. Thus, the processor controlling the loop filter selects the appropriate digital parameters to ensure the best operation of the pilot phase tracking loop. It is further noted that the loop filter and the determination of the respective digital parameters as described herein is well understood in art.

TABLE 1

|  | $\omega_n/2\pi$ | $\zeta$ | $K_1$ | $K_{1d}$ (13Q0u) | $K_2$ | $K_2*16$ (Q4) | $K_{2d\_shift}$ |
|---|---|---|---|---|---|---|---|
| 0 | 2000 Hz | 0.50 | 167.71 | 168 | 0.05175 | 0.8 | <<0 |
| 1 | 2000 Hz | 0.707 | 232.90 | 233 | 0.05175 | 0.8 | <<0 |
| 2 | 2000 Hz | 0.90 | 296.48 | 294 | 0.05175 | 0.8 | <<0 |
| 3 | 4000 Hz | 0.50 | 329.42 | 329 | 0.20698 | 3.31 | <<2 |
| 4 | 4000 Hz | 0.707 | 465.8 | 466 | 0.20698 | 3.31 | <<2 |
| 5 | 4000 Hz | 0.90 | 592.96 | 593 | 0.20698 | 3.31 | <<2 |
| 6 | 6000 Hz | 0.50 | 494.13 | 494 | 0.46571 | 7.45 | <<3 |
| 7 | 6000 Hz | 0.707 | 698.7 | 699 | 0.46571 | 7.45 | <<3 |
| 8 | 6000 Hz | 0.90 | 889.43 | 889 | 0.46571 | 7.45 | <<3 |
| 9 | 8000 Hz | 0.50 | 658.84 | 659 | 0.82792 | 13.25 | <<4 |
| 10 | 8000 Hz | 0.707 | 931.6 | 932 | 0.82792 | 13.25 | <<4 |

TABLE 1-continued

| | $\omega_n/2\pi$ | $\zeta$ | $K_1$ | $K_{1d}$ (13Q0u) | $K_2$ | $K_2*16$ (Q4) | $K_{2d\_shift}$ |
|---|---|---|---|---|---|---|---|
| 11 | 8000 Hz | 0.90 | 1185.91 | 1186 | 0.82792 | 13.25 | <<4 |
| 12 | 10000 Hz | 0.50 | 823.55 | 824 | 1.29363 | 20.7 | <<4 |
| 13 | 10000 Hz | 0.707 | 1164.5 | 1165 | 1.29363 | 20.7 | <<4 |
| 14 | 10000 Hz | 0.90 | 1482.39 | 1482 | 1.29363 | 20.7 | <<4 |
| 15 | Res. | Res. | Res. | Res. | Res. | Res. | Res. |
| ... | ... | ... | ... | ... | ... | ... | ... |
| 31 | Res. | Res. | Res. | Res. | Res. | Res. | Res. |

Figure 15:
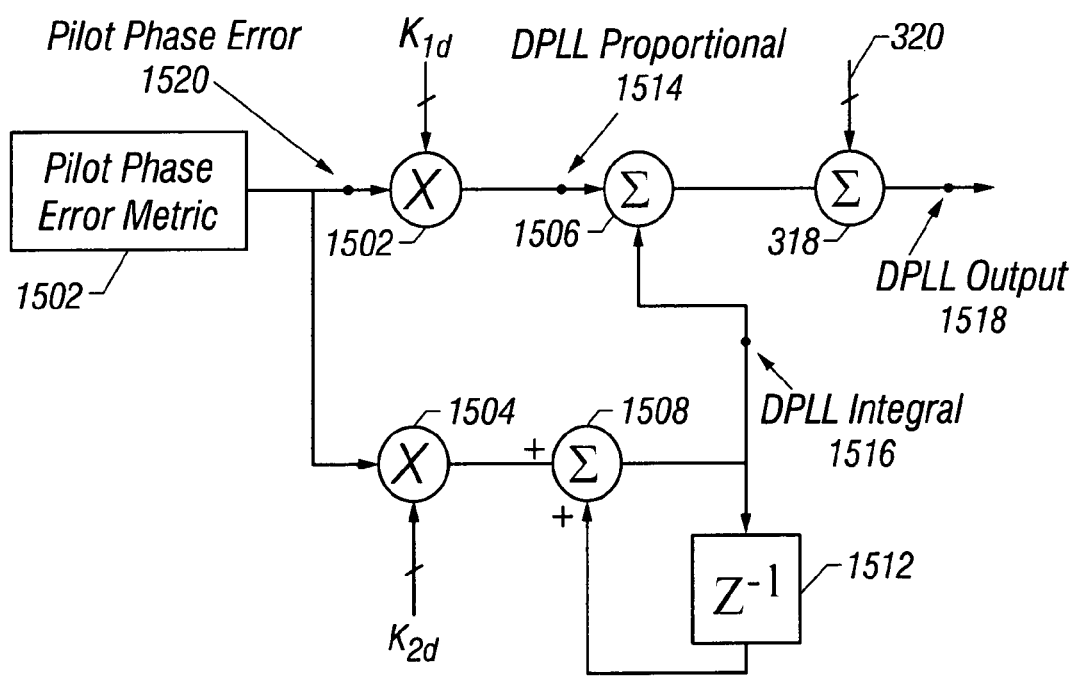
FIG. 15 is a functional block diagram illustrating a simulated version of the digital loop filter of FIG. 14.
Figure 16:
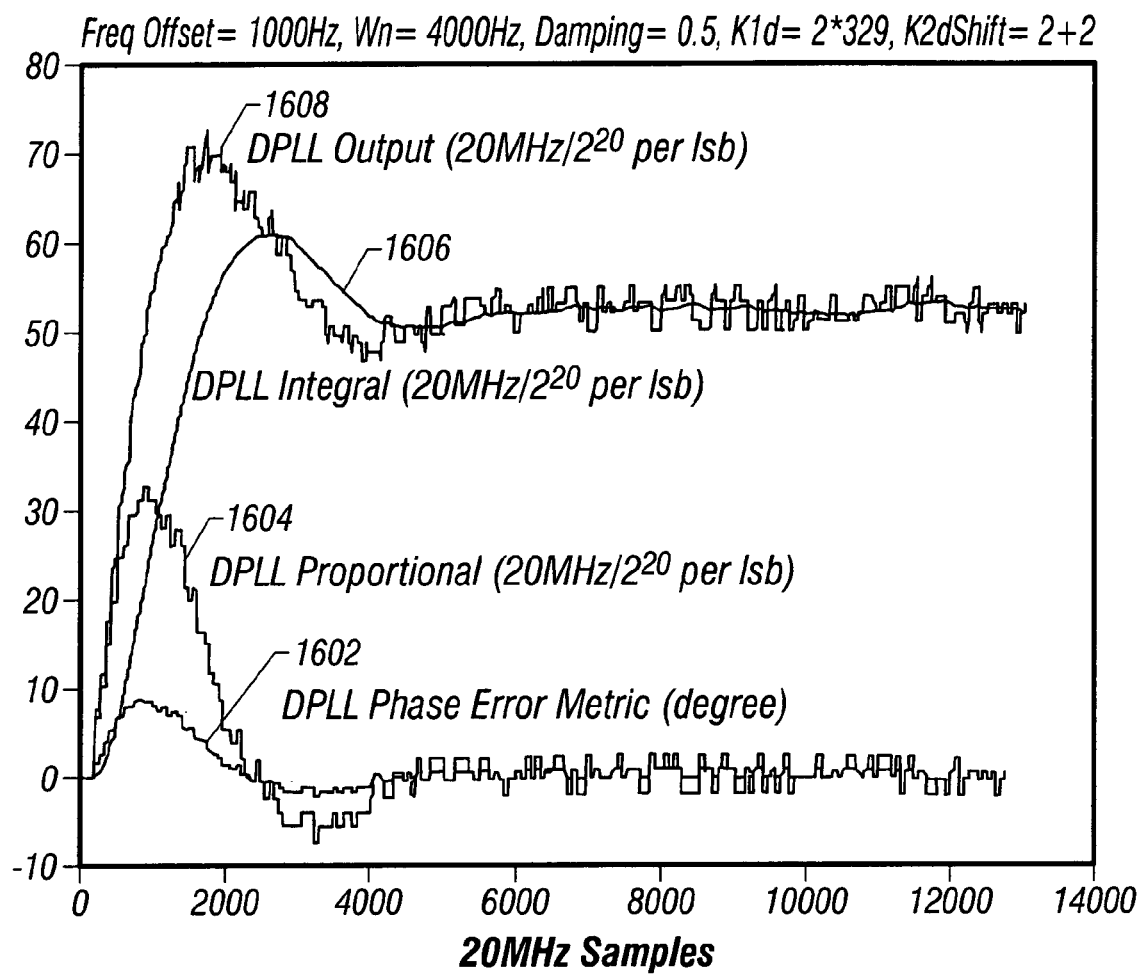
FIG. 16 is a graph illustrating the response of the simulated tracking loop filter of FIG. 15 as measured at the indicated probe points in FIG. 15.

Referring next to FIG. 15, a functional block diagram is shown illustrating a simulated version of the digital loop filter of FIG. 14. Illustrated is the pilot phase error metric 1502, multipliers 1502 and 1504, summations 1506, 1508 and 318, and z-transform 1512. Also shown are the probe points in the simulation, i.e., the pilot phase error metric 1520, the DPLL proportional 1514, the DPLL Integral 1516 and the DPLL output 1518. The simulation was done using a fixed point Matlab simulation. The results of the simulation at the probe points are plotted in FIG. 16 for an initial frequency offset of 1000 Hz with $\omega_n=2\pi 4000$ Hz, $\xi=0.5$, $K_{1d}=329*2$ and $K_{2d\_shift}=2+2$ at a 20 MHz rate. Line 1602 represents the output of the pilot phase error metric 1520, line 1604 represents the DPLL proportional 1514, line 1606 represents the DPLL Integral 1516 and line 1608 represents the DPLL output 1518 after being summed with the coarse/fine frequency estimate signal 320 at the summation 318.

Thus, for a step change in frequency of about 1000 Hz, it can be seen that the transient peak time of occurrence is approximately 48.12 sec or 962 samples at 20 MHz and the peak phase error is approximately 7.8°. It is noted that in operation, the actual peak time of the phase error metric will be longer than 962 samples because the loop filter does not run during the guard interval of the OFDM symbol. Thus, as can be seen in the simulation, the pilot tracking loop quickly acquires the initial frequency error thereby eliminating frequency errors prior to the FFT in the OFDM receiver.

Referring briefly to FIG. 1, frequency pulling (due to slight impedance changes imposed on the output of the main local oscillator frequency synthesizer or LO 108) and frequency pushing (due to primarily slight D.C. supply changes resulting from current load changes) can result in serious frequency errors particularly at the beginning of a user's time slot. Frequency pulling is a frequency error primarily caused by the switching of the OFDM transceiver between transmit and receive operations. It is noted that although FIG. 1 illustrates the OFDM receiver 100, the OFDM receiver 100 may be a part of an OFDM transceiver including an OFDM transmitter. Such an OFDM receiver and OFDM transmitter may be integrated into one or more devices and together comprise the OFDM transceiver. Frequency pushing is a frequency error that arises from power supply noise or contamination. Frequency pushing is most problematic at frequencies on the order of the natural loop frequency $\omega_n$ of the pilot tracking loop. It is noted that the concepts of frequency pulling and frequency pushing are well understood in the art. Furthermore, as described above, the total frequency error between an OFDM transmitter (not shown) and the OFDM receiver 100 should be on the order of 100 Hz or less for 64-QAM or higher modulation operation. This is a stringent requirement according to preferred embodiments where the operational frequency is in the 5 GHz range and 100 Hz represents roughly 0.02 parts-per-million (ppm). Thus, ideally, frequency pulling and frequency pushing occurring at the beginning of an OFDM MAC frame should be kept to the 100 Hz maximum.

The pilot tracking loops are described above with reference to FIGS. 2-16 are designed to reduce phase/frequency errors by tracking the pilots of the OFDM waveform. Thus, at lower frequency offsets, the pilot tracking loop (e.g., pilot tracking loops 300 and 806 in the baseband processing 106 portion) adequately reduces this effect. However, in cases where frequency pulling and frequency pushing cause a frequency error greater than 100 Hz, the pilot tracking loop may be further modified to minimize this effect.

Since frequency pulling and frequency pushing primarily occur at the beginning of a time slot, and according to one embodiment of the invention, the closed loop bandwidth of the pilot tracking loop is operated wider than the nominally designed closed loop tracking bandwidth at the front end of the time slot when receiving OFDM data symbols in order to minimize the phase tracking error due to the frequency transient. Then, the closed loop bandwidth of the pilot tracking loop is subsequently reduced later in the time slot to the nominally designed closed loop tracking bandwidth once the frequency error has been adequately contained. Generally, widening the closed loop bandwidth improves the frequency error pull-in time and frequency pulling and pushing issues of the pilot tracking loop up to a point, but it also allows more Gaussian noise contribution to fall within the pilot tracking loop.

In some embodiments, the RF frequency pushing and pulling are kept to the 100 Hz maximum. The PTL is designed such that it can be used to mitigate frequency pushing and pulling problems at the beginning of a user burst if this objective is not met. In doing this, the PTL closed-loop bandwidth can be increased at the front-end of the time slot in order to minimize the phase tracking error due to the frequency transient and the bandwidth subsequently reduced later in the time slot once the frequency error has been adequately contained. The larger bandwidth will result in poorer performance due to Gaussian channel noise however, so the degree of bandwidth expansion used must be chosen to optimize the overall result.

Generally, the parameters of the pilot tracking loops 300 and 806 are designed to minimize the overall quantity given by $$\theta_{Tot} = \theta_{Transient} + \eta\sqrt{\theta_{AWGN}^2 + \theta_{LO}^2} \qquad \text{Eq. (21)}$$

where $\theta_{Transient}$ is the peak phase transient caused by any initial frequency error at the beginning of a user burst, $\theta_{AWGN}$ is the Gaussian rms noise contribution from the receive channel that falls within the PTL noise bandwidth, and $\theta_{LO}$ is the phase noise contribution from the transmitter and receiver local oscillators that still remains after clean-up by the PTL. In Eq. (21), $\eta$ is a confidence factor that should be taken to be in the range of 1.0 to 3.0.

The choice of PTL parameters that minimize $\theta_{Tot}$ of Eq. (21) primarily depend upon (a) the received signal SNR, (b) the phase noise spectrum of the transmitter and receiver local oscillators, and (c) the amount of initial frequency error that must be handled at the beginning of each time slot. If for a given scenario an acceptably small $\theta_{Tot}$ cannot be achieved relative to the signal constellation type being used (e.g., 16-QAM), the net result is a loss of receiver sensitivity. Thus, as can be seen in Eq. (21), the effect of increasing the closed loop tracking bandwidth is an increase in the total phase error. Thus, once the effects of frequency pulling and frequency pushing are sufficiently reduced, the closed loop bandwidth of the pilot tracking loop is reduced. This allows for the OFDM transceiver to be able to support communications of at least QPSK modulation (i.e., 4-ary QAM) or higher, e.g., 16-QAM, 64-QAM, etc.

Figure 17:
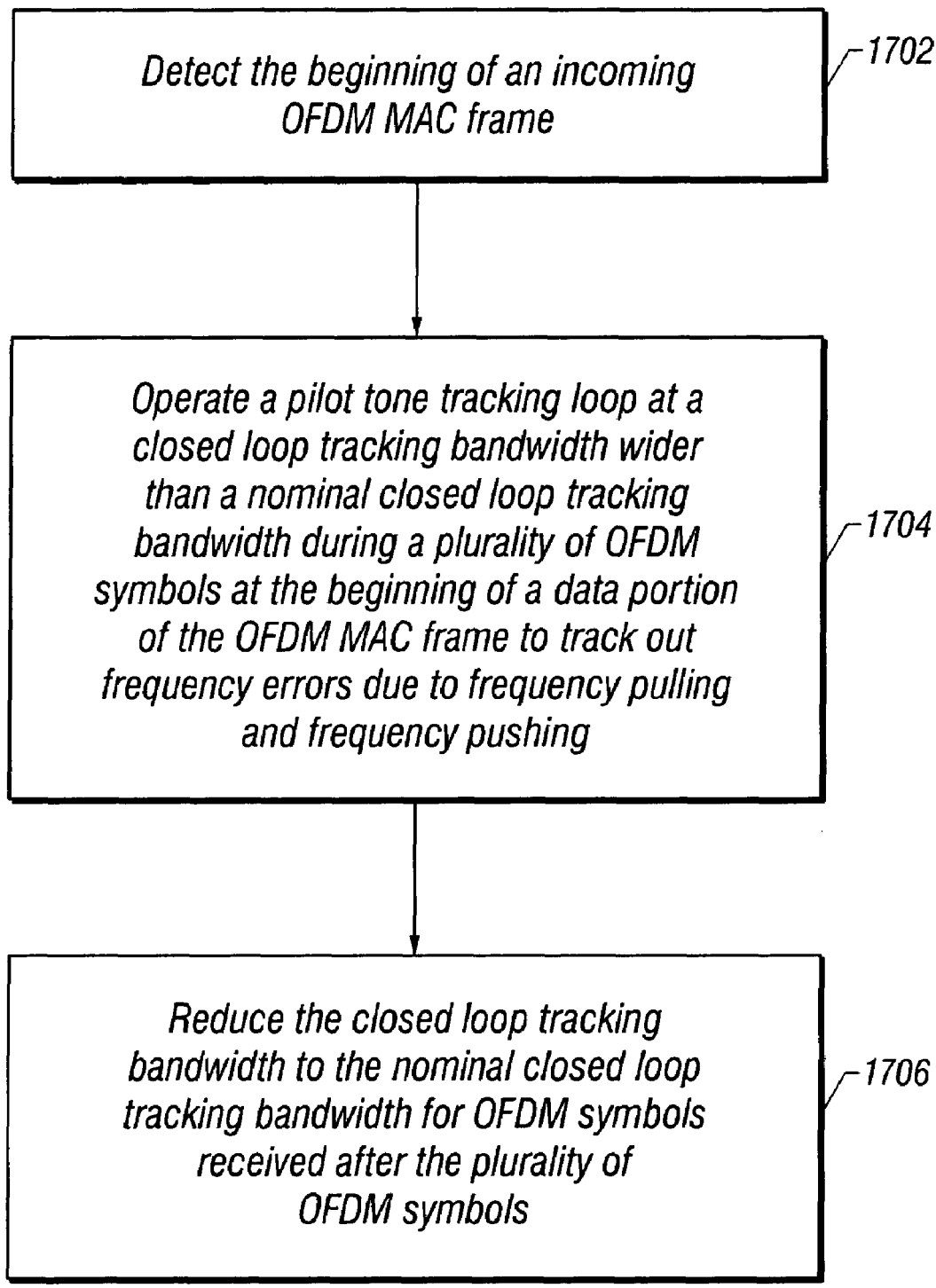
FIG. 17 is a flowchart is shown of the steps performed to reduce the effects of frequency pulling and frequency pushing according to another embodiment of the invention.

Referring next to FIG. 17, a flowchart is shown of the steps performed to reduce the effects of frequency pulling and frequency pushing according to another embodiment of the invention. Initially, the OFDM receiver detects the beginning of an OFDM MAC frame (Step 1702). The preamble of the MAC frame is processed as described above. Normally, once the preamble is finished and the OFDM data symbols are received in the data portion of the MAC frame, the pilot tracking loop is activated, such that the pilot tracking loop has a nominal closed loop tracking bandwidth.

According to one embodiment, if it is determined that frequency pulling and frequency pushing are causing a frequency error between receive and transmit operations greater than a specified amount (e.g., 100 Hz in this embodiment), the closed loop tracking bandwidth operated at a closed loop tracking bandwidth that is greater than the nominal closed loop tracking bandwidth during a specified number of OFDM data symbols at the beginning of the data portion of the MAC frame (Step 1704). It is noted that the amount of the increase in the closed loop bandwidth above the nominal closed loop tracking bandwidth and the number of data symbols that the increased bandwidth is used varies depending on the requirements of the particular system. Furthermore, it is noted that operating the bandwidth above the nominally designed closed loop tracking bandwidth for a given system is normally not desirable since this allows for more Gaussian noise to be introduced into the pilot tracking loop.

Next, after the specified number of OFDM data symbols, the closed loop tracking bandwidth is subsequently reduced back to the nominal closed loop tracking bandwidth (Step 1706). With careful altering of the closed loop tracking bandwidth, the effects of frequency pulling and frequency pushing can be reduced, e.g., reduced such that the frequency error between transmitter and receiver is less than the prescribed amount, (in this case, reduced to less than 100 Hz). According to this embodiment, in order to minimize the additional Gaussian noise contribution, the closed loop bandwidth is returned to the nominal value. It is noted that according to this embodiment, the closed loop tracking bandwidth is altered during the data portion of a single OFDM MAC frame. Again, the increase in the bandwidth above the nominally designed closed loop tracking bandwidth and the duration of increase will vary depending on the system.

The steps of FIG. 17 are typically performed as a set of instructions that are performed in dedicated hardware or in software using a processor or other machine to execute the instructions to accomplish the given steps. For example, the steps of FIG. 17 are performed by the pilot tracking loop of the baseband processing portion of an OFDM receiver as controlled by a processor or other component.

While the invention herein disclosed has been described by means of specific embodiments and applications thereof, numerous modifications and variations could be made thereto by those skilled in the art without departing from the scope of the invention set forth in the claims.

What is claimed is:

1. A pilot phase tracking loop for an orthogonal frequency division multiplexed (OFDM) receiver comprising:
   a phase rotator for receiving and phase de-rotating an incoming signal;
   a fast Fourier transform to be coupled to an output of the phase rotator for processing a signal output from the phase rotator;
   a pilot phase error metric including a discrete Fourier transform portion, the discrete Fourier transform portion coupled to the output of the phase rotator, wherein the pilot phase error metric determines a phase error estimate associated with a received OFDM symbol of the signal output from the phase rotator;
   a loop filter to be coupled to an output of the pilot phase error metric; and
   an oscillator to be coupled to an output of the loop filter and having an output to be coupled to the phase rotator such that the phase rotator is adapted to adjust the phase of subsequent OFDM symbols of the incoming signal arriving after the received OFDM symbol by the phase error estimate.

2. The pilot phase tracking loop of claim 1 wherein the pilot phase error metric uses a maximum likelihood estimation that processes complex signal measurements corresponding to each of a plurality of pilots of the received OFDM symbol in comparison to pilot reference points corresponding to each of a plurality of pilots of an OFDM preamble waveform.

3. The pilot phase tracking loop of claim 2 wherein the phase error estimate comprises an aggregate phase error estimate of the received OFDM symbol relative to the pilot reference points corresponding to the OFDM preamble waveform.

4. The pilot phase tracking loop of claim 2 wherein the discrete Fourier transform portion of the pilot phase error metric is used to determine the pilot reference points corresponding to the plurality of pilots of the OFDM preamble waveform and determines the complex signal measurements corresponding to each of the plurality of pilots of the received OFDM symbol and of the subsequent OFDM symbols.

5. The pilot phase tracking loop of claim 2 further comprising a pilot reference storage to be coupled to the pilot phase error metric for storing the pilot reference points.

6. The pilot phase tracking loop of claim 1 wherein the pilot phase error metric uses a maximum likelihood estimation that processes complex signal measurements corresponding to each of a plurality of pilots of the received OFDM symbol in comparison to pilot reference points corresponding to each of a plurality of pilots of an OFDM symbol received prior to the received OFDM symbol.

7. The pilot phase tracking loop of claim 1 further comprising a radio portion of the OFDM receiver to provide the incoming signal to the phase rotator, wherein the pilot phase tracking loop compensates for phase noise introduced in the radio portion and phase noise introduced by a transmitting radio portion of an OFDM transmitter communicating with the OFDM receiver.

8. The pilot phase tracking loop of claim 7 wherein the phase noise performance of a local oscillator of the radio portion is greater than about −80 dBc/Hz at a 10 kHz frequency offset.

9. The pilot phase tracking loop of claim 1 wherein a phase noise of the signal output from the phase rotator after adjustment is reduced.

10. The pilot phase tracking loop of claim 9 wherein the phase noise of the signal output from the phase rotator after adjustment is reduced to less than about 1 degree rms.

11. The pilot phase tracking loop of claim 10 wherein the phase noise of the incoming signal received at the phase rotator is less than about 2.5 degrees rms.

12. The pilot phase tracking loop of claim 9 wherein the phase noise of the signal output from the phase rotator after adjustment is reduced to less than about 0.5 degrees rms.

13. The pilot phase tracking loop of claim 12 wherein the phase noise of the incoming signal received at the phase rotator is less than about 2.5 degrees rms.

14. The pilot phase tracking loop of claim 1 further comprising a pseudo random pilot modulation generator to be coupled to the pilot phase error metric for removal of a priori known pseudo-random pilot modulation.

15. The pilot phase tracking loop of claim 1 wherein, after adjustment of the phase rotator, a phase noise of the subsequent OFDM symbols at the output of the phase rotator is minimized.

16. A method of pilot phase tracking in an orthogonal frequency division multiplexed (OFDM) receiver comprising:
receiving a baseband signal corresponding to an OFDM preamble waveform at a discrete Fourier transform portion of the OFDM receiver, wherein the discrete Fourier transform portion is to perform a separate processing operation from a fast Fourier transform portion of the OFDM receiver;
determining pilot reference points corresponding to a plurality of pilots of the OFDM preamble waveform;
receiving a baseband signal corresponding to an OFDM symbol at the discrete Fourier transform portion;
determining complex signal measurements corresponding to each of a plurality of pilots of the OFDM symbol;
determining a phase error estimate corresponding to the OFDM symbol based on the pilot reference points and the complex signal measurements;
filtering the phase error estimate; and
rotating a phase of an incoming signal corresponding to subsequent OFDM symbols to be received at the fast Fourier transform portion after the OFDM symbol by the filtered phase error estimate;
wherein a phase noise of the incoming signal corresponding to the subsequent OFDM symbols to be received at the fast Fourier transform portion is reduced.

17. The method of claim 16 wherein small frequency errors remaining after a coarse and fine frequency estimation occurring during the OFDM preamble waveform are tracked out.

18. The method of claim 16 wherein the determining the phase error estimate comprises determining an aggregate phase error estimate of the OFDM symbol relative to the pilot reference points using the complex signal measurements corresponding to each of the plurality of pilots of the OFDM symbol and the pilot reference points.

19. The method of claim 18 wherein the determining the aggregate phase error estimate comprises performing a maximum likelihood-based estimation using the complex signal measurements for the OFDM symbol and the pilot reference points.

20. The method of claim 19 wherein the determining the aggregate phase error estimate is represented mathematically as:

$$\hat{\theta}_m = \tan^{-1}\left[\frac{\sum_{k=0}^{n-1}(u_k Q_{k,m} - v_k I_{k,m})}{\sum_{k=0}^{n-1}(u_k I_{k,m} + v_k Q_{k,m})}\right]$$

where $\hat{\theta}_m$ is the aggregate phase error estimate for the OFDM symbol having a time index m, wherein $U_k$ and $V_k$ represent in-phase (I) and quadrature (Q) values, respectively, for the pilot reference points for n pilots of the OFDM preamble waveform, and where $I_{k,m}$ and $Q_{km}$ represent the complex signal measurements corresponding to the $k^{th}$ pilot of the $m^{th}$ OFDM symbol.

21. The method of claim 16 wherein the determining the pilot reference points comprises determining the pilot reference points corresponding to the plurality of pilots of a long symbol portion of the OFDM preamble waveform.

22. The method of claim 16 wherein the determining the pilot reference points and determining the complex signal measurements comprise processing the baseband signal corresponding to a long symbol portion of the OFDM preamble waveform and the baseband signal corresponding to the OFDM symbol with the discrete Fourier transform portion.

23. The method of claim 16 wherein the rotating compensates for phase noise introduced by a radio portion of the OFDM receiver that provides the incoming signal and phase noise introduced by a transmitting radio portion of an OFDM transmitter communicating with the OFDM receiver.

24. The method of claim 23 wherein the phase noise performance of a local oscillator of the radio portion is greater than about −80 dBc/Hz at a 10 kHz frequency offset.

25. The method of claim 16 wherein, after the rotating step, the phase noise of the incoming signal corresponding to the subsequent OFDM symbols is reduced to less than about 1 degree rms.

26. The method of claim 25 wherein the phase noise of the incoming signal corresponding to the subsequent OFDM symbols is less than about 2.5 degrees rms prior to the rotating step.

27. The method of claim 16 wherein, after the rotating step, the phase noise of the incoming signal corresponding to the subsequent OFDM symbols is reduced to less than about 0.5 degrees rms.

28. The method of claim 27 wherein the phase noise of the incoming signal corresponding to the subsequent OFDM symbols is less than about 2.5 degrees rms prior to the rotating step.

29. A method of pilot phase tracking in an orthogonal frequency division multiplexed (OFDM) receiver comprising:
receiving a signal representing an OFDM waveform at a discrete Fourier transform portion of the OFDM receiver, wherein the discrete Fourier transform portion is to execute a separate processing operation from a fast Fourier transform portion of the OFDM receiver that also receives the signal;
determining a phase error estimate corresponding to an OFDM symbol of the OFDM waveform; filtering the phase error estimate;
and rotating a phase of the signal for subsequent OFDM symbols to be received at the fast Fourier transform portion after the OFDM symbol by the filtered phase error estimate, wherein a phase noise of the signal for the subsequent OFDM symbols to be received at the fast Fourier transform portion is reduced.

30. The method of claim 29 wherein the determining the phase error estimate comprises determining an aggregate phase error estimate of the OFDM symbol relative to a pilot phase corresponding to an OFDM preamble portion of the OFDM waveform.

31. The method of claim 30 wherein the determining the phase error estimate further comprises:
   determining pilot reference points corresponding to each of a plurality of pilots corresponding to the OFDM preamble portion of the OFDM waveform; and
   determining complex signal measurements corresponding to each of a plurality of pilots of the OFDM symbol;
   wherein the determining the aggregate phase error estimate includes processing the complex signal measurements and the pilot reference points using maximum likelihood-based estimation.

32. The method of claim 29 wherein the determining the phase error estimate comprises determining an aggregate phase error estimate of the OFDM symbol relative to a pilot phase corresponding to a previous OFDM symbol.

33. A pilot phase tracking loop for an orthogonal frequency division multiplexed system (OFDM) receiver, comprising:
   a phase rotator to receive and to phase de-rotate an incoming signal;
   a pilot phase error metric comprising a processor to execute software that, if executed by the processor, causes the processor to implement determining a phase error estimate associated with a received OFDM symbol of a signal output from the phase rotator, said determining including executing a discrete Fourier transform on the signal output from the phase rotator and executing a separate processing operation from a fast Fourier transform of the OFDM receiver that also receives the signal output from the phase rotator;
   a loop filter to be coupled to an output of the pilot phase error metric; and
   an oscillator to be coupled to an output of the loop filter and having an output to be coupled to the phase rotator such that the phase rotator is adapted to adjust the phase of subsequent OFDM symbols of the incoming signal arriving after the received ODFM symbol by the phase error estimate.

34. The tracking loop of claim 33, further comprising:
   a fast Fourier transform to be coupled to an output of the phase rotator for processing the signal output from the phase rotator.

35. The tracking loop of claim 33, wherein the determining the phase error estimate comprises determining an aggregate phase error estimate of the received OFDM symbol relative to a pilot phase corresponding to an OFDM preamble portion of an OFDM waveform.

36. The tracking loop of claim 35, wherein the determining the phase error estimate further comprises:
   determining pilot reference points corresponding to each of a plurality of pilots corresponding to the OFDM preamble portion of the OFDM waveform; and
   determining complex signal measurements corresponding to each of a plurality of pilots of the OFDM symbol;
   wherein the determining the aggregate phase error estimate includes processing the complex signal measurements and the pilot reference points using maximum likelihood-based estimation.

37. The tracking loop of claim 33, wherein the determining the phase error estimate comprises determining an aggregate phase error estimate of the received OFDM symbol relative to a pilot phase corresponding to a previous OFDM symbol.

* * * * *